(12) United States Patent
Thomas

(10) Patent No.: US 9,630,071 B2
(45) Date of Patent: *Apr. 25, 2017

(54) GOLF CLUB HEAD OR OTHER BALL STRIKING DEVICE HAVING CUSTOM MACHINABLE PORTIONS

(71) Applicant: NIKE, INC., Beaverton, OR (US)

(72) Inventor: James S. Thomas, Fort Worth, TX (US)

(73) Assignee: Karsten Manufacturing Corporation, Phoenix, AZ (US)

(*) Notice: Subject to any disclaimer, the term of this patent is extended or adjusted under 35 U.S.C. 154(b) by 244 days.

This patent is subject to a terminal disclaimer.

(21) Appl. No.: 14/458,636

(22) Filed: Aug. 13, 2014

(65) Prior Publication Data

US 2014/0357399 A1    Dec. 4, 2014

Related U.S. Application Data

(63) Continuation of application No. 13/074,885, filed on Mar. 29, 2011, now Pat. No. 8,827,836.

(51) Int. Cl.
*A63B 53/04* (2015.01)
*A63B 53/06* (2015.01)
(Continued)

(52) U.S. Cl.
CPC ............ *A63B 53/047* (2013.01); *A63B 53/04* (2013.01); *A63B 53/0466* (2013.01);
(Continued)

(58) Field of Classification Search
USPC .................................................. 473/324–350
See application file for complete search history.

(56) References Cited

U.S. PATENT DOCUMENTS

| 1,598,050 A | 8/1926 | Butchart |
| 3,556,532 A | 1/1971 | Ballmer |

(Continued)

FOREIGN PATENT DOCUMENTS

| JP | 07222830 A | 8/1995 |
| JP | 2007330335 A | 12/2007 |

(Continued)

OTHER PUBLICATIONS

International Search Report and Written Opinion Dated Aug. 21, 2012 in PCT Application No. PCT/US2012/028005.

*Primary Examiner* — Alvin Hunter
(74) *Attorney, Agent, or Firm* — Banner & Witcoff, Ltd.

(57) ABSTRACT

A ball striking device, such as a golf club, includes a head with a face having a ball-striking surface configured for striking a ball, a body connected to the face, and at least one weight element connected to the body. The head has a total weight that is higher than a target weight of the head, and the at least one weight element is configured to be at least partially removed by a material removal technique to lower the total weight of the head to approximately equal the target weight. The at least one weight element may be integrally connected to the body, such as being integrally formed with at least a portion of the body. The material removal technique may constitute milling, machining, or other material removal techniques or combination of such techniques.

14 Claims, 25 Drawing Sheets

(51) Int. Cl.
  *B23C 3/28*  (2006.01)
  *A63B 60/52*  (2015.01)
(52) U.S. Cl.
  CPC .......... *A63B 53/0475* (2013.01); *A63B 60/52* (2015.10); *B23C 3/28* (2013.01); *A63B 2053/0412* (2013.01); *A63B 2053/0433* (2013.01); *A63B 2053/0491* (2013.01); *A63B 2225/01* (2013.01); *Y10T 29/49995* (2015.01); *Y10T 409/303752* (2015.01)

(56) References Cited

U.S. PATENT DOCUMENTS

| | | |
|---|---|---|
| 3,941,390 A | 3/1976 | Hussey |
| 4,206,924 A | 6/1980 | Koralik |
| 4,890,840 A | 1/1990 | Kobayashi |
| 5,143,571 A | 9/1992 | Lacoste et al. |
| 5,272,802 A | 12/1993 | Stites, III |
| 5,273,283 A | 12/1993 | Bowland |
| 5,584,770 A * | 12/1996 | Jensen ................ A63B 53/04 473/334 |
| 5,788,584 A | 8/1998 | Parente et al. |
| 6,093,112 A | 7/2000 | Peters et al. |
| 6,508,978 B1 | 1/2003 | Deshmukh |
| 6,511,387 B2 | 1/2003 | Grieb |
| 6,685,577 B1 | 2/2004 | Scruggs et al. |
| 6,773,360 B2 | 8/2004 | Willett et al. |
| 7,077,762 B2 | 7/2006 | Kouno et al. |
| 7,166,040 B2 | 1/2007 | Hoffman et al. |
| 7,445,564 B2 | 11/2008 | Kusumoto |
| 8,827,836 B2 * | 9/2014 | Thomas ................ A63B 53/04 473/345 |
| 2004/0087388 A1 | 5/2004 | Beach et al. |
| 2008/0119303 A1 | 5/2008 | Bennett et al. |

FOREIGN PATENT DOCUMENTS

| | | |
|---|---|---|
| JP | 2008149014 A | 7/2008 |
| WO | 0025871 A1 | 5/2000 |

\* cited by examiner

GOLF CLUB HEAD OR OTHER BALL STRIKING DEVICE HAVING CUSTOM MACHINABLE PORTIONS

CROSS REFERENCE TO RELATED APPLICATION

The present application is a continuation of U.S. patent application Ser. No. 13/074,885 filed Mar. 29, 2011 and entitled "GOLF CLUB HEAD OR OTHER BALL STRIKING DEVICE HAVING CUSTOM MACHINABLE PORTIONS", which application is entirely incorporated herein by reference.

TECHNICAL FIELD

The invention relates generally to ball striking devices, such as golf club heads, having one or more machinable weight elements connected to the head. Certain aspects of this invention relate to golf club heads having one or more weight elements configured to be at least partially removed by machining or another material removal technique to lower the total weight of the head to approximately equal a target weight.

BACKGROUND

Golf is enjoyed by a wide variety of players—players of different genders, and players of dramatically different ages and skill levels. Golf is somewhat unique in the sporting world in that such diverse collections of players can play together in golf outings or events, even in direct competition with one another (e.g., using handicapped scoring, different tee boxes, etc.), and still enjoy the golf outing or competition. These factors, together with increased golf programming on television (e.g., golf tournaments, golf news, golf history, and/or other golf programming) and the rise of well known golf superstars, at least in part, have increased golfs popularity in recent years, both in the United States and across the world.

Golfers at all skill levels seek to improve their performance, lower their golf scores, and reach that next performance "level." Manufacturers of all types of golf equipment have responded to these demands, and recent years have seen dramatic changes and improvements in golf equipment. For example, a wide range of different golf ball models now are available, with some balls designed to fly farther and straighter, provide higher or flatter trajectory, provide more spin, control, and feel (particularly around the greens), etc.

Being the sole instrument that sets a golf ball in motion during play, the golf club also has been the subject of much technological research and advancement in recent years. For example, the market has seen improvements in golf club heads, shafts, and grips in recent years. Additionally, other technological advancements have been made in an effort to better match the various elements of the golf club and characteristics of a golf ball to a particular user's swing features or characteristics (e.g., club fitting technology, ball launch angle measurement technology, etc.).

Despite the various technological improvements, golf remains a difficult game to play at a high level. For a golf ball to reliably fly straight and in the desired direction, a golf club must meet the golf ball square (or substantially square) to the desired target path. Moreover, the golf club must meet the golf ball at or close to a desired location on the club head face (i.e., on or near a "desired" or "optimal" ball contact location) to reliably fly straight, in the desired direction, and for a desired distance. Off-center hits may tend to "twist" the club face when it contacts the ball, thereby sending the ball in the wrong direction, imparting undesired hook or slice spin, and/or robbing the shot of distance. Club face/ball contact that deviates from squared contact and/or is located away from the club's desired ball contact location, even by a relatively minor amount, also can launch the golf ball in the wrong direction, often with undesired hook or slice spin, and/or can rob the shot of distance. Accordingly, club head features that can help a user keep the club face square with the ball would tend to help the ball fly straighter and truer, in the desired direction, and often with improved and/or reliable distance.

Various golf club heads have been designed to improve a golfer's accuracy by assisting the golfer in squaring the club head face at impact with a golf ball. When the club face is not square at the point of engagement, the golf ball may fly in an unintended direction and/or may follow a route that curves left or right, ball flights that are often referred to as "pulls," "pushes," "draws," "fades," "hooks," or "slices," or may exhibit more boring or climbing trajectories.

Many off-center golf hits are caused by common errors in swinging the golf club that are committed repeatedly by the golfer, and which may be similarly committed by many other golfers. As a result, patterns can often be detected, where a large percentage of off-center hits occur in certain areas of the club face. For example, one such pattern that has been detected is that many high handicap golfers tend to hit the ball on the low-heel area of the club face and/or on the high-toe area of the club face. Other golfers may tend to miss in other areas of the club face. Because golf clubs are typically designed to contact the ball at or around the center of the face, such off-center hits may result in less energy being transferred to the ball, decreasing the distance of the shot. The energy or velocity transferred to the ball by a golf club also may be related, at least in part, to the flexibility of the club face at the point of contact, and can be expressed using a measurement called "coefficient of restitution" (or "COR"). The maximum COR for golf club heads is currently limited by the USGA at 0.83.

The energy or velocity transferred to the ball may also be related, at least in part, to the weight distribution, the moment of inertia (MOI), and/or the location of the center of gravity of the club head. Likewise, the degree of twisting of the club head upon impact may also be related, at least in part, to the weight distribution, the moment of inertia (MOI), and/or the location of the center of gravity of the club head. In general, a head will incur less twisting and will produce greater energy transfer when the center of gravity is closer to being directly behind the point of impact on the face, although exceptions may exist. Additionally, a head having a greater MOI will incur less twisting and will produce greater energy transfer on off-center hits, although exceptions may exist. Accordingly, a need exists to customize or adjust the weight distribution, the moment of inertia (MOI), and/or the location of the center of gravity of the club head. Such customization may be done to provide maximum energy transfer and to limit the degree of twisting in off-center areas of the face, such as in the areas of the face where off-center hits tend to occur most, in order to produce straighter and longer shots on impacts in those areas of the face. Such customization may also be done to customize the direction of ball flight and/or spin characteristics of a ball upon impact, to achieve a club that produces a specific type of ball flight (e.g., hooking, slicing, drawing, etc.).

The present device and method are provided to address the problems discussed above and other problems, and to provide advantages and aspects not provided by prior ball striking devices of this type. A full discussion of the features and advantages of the present invention is deferred to the following detailed description, which proceeds with reference to the accompanying drawings.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the invention relate to ball striking devices, such as golf clubs, with a head that includes a face configured for striking a ball and a body connected to the face, the body being adapted for connection of a shaft thereto. Various example structures of heads described herein include at least one weight element connected to the body, wherein the head has a total weight that is higher than a target weight of the head, and the weight element(s) is/are configured to be at least partially removed by a material removal technique to lower the total weight of the head to approximately equal the target weight. In one embodiment, the at least one weight element may be integrally connected to the body, such as being integrally formed with at least a portion of the body.

According to one aspect, the at least one weight element includes a first leg extending along a heel side of the body, a second leg extending along a toe side of the body, and a third leg extending along a rear side of the body. In one embodiment, the first, second, and third legs are connected together, to form a generally U-shaped weight element. In another embodiment, the at least one weight element may further include a fourth leg extending along a peripheral edge of the face. The first, second, and third legs may be located on a sole of the body.

According to another aspect, the at least one weight element is located on an outer surface of the sole of the body. One or more additional weight elements may be located elsewhere on the body.

According to a further aspect, the body has an inner cavity defined by an inner surface of the face and an inner surface of the body, and the at least one weight element is located on the inner surface of the body within the inner cavity.

According to a still further aspect, at least a portion of the body is formed of a metallic material, and the at least one weight element is integrally formed with the at least a portion of the body formed of the metallic material.

According to additional aspects, the head may be a driver head having an initial weight of 230 g and a target weight of 200 g, a fairway wood head having an initial weight of 250 g and a target weight of 215 g, or an iron-type head having an initial weight and target weight that vary based on club type.

Other aspects of the invention relate to a wood-type golf club head that includes a wood-type face having ball-striking surface configured for striking a ball, and a wood-type body connected to the face and extending rearward from the face to define a cavity bounded by the face and the body, such that the body and the face enclose a volume. In one embodiment, where the head is a driver head, the volume enclosed may be at least 400 cubic centimeters. The head includes at least one weight element integrally formed with the body, such that the head has a total weight that is higher than a target weight of the head. The at least one weight element is configured to be at least partially removed by machining to lower the total weight of the head to approximately equal the target weight.

According to one aspect, the at least one weight element includes a first leg extending along a heel side of the body, a second leg extending along a toe side of the body, and a third leg extending along a rear side of the body. In one embodiment, the first, second, and third legs are connected together, to form a generally U-shaped weight element. In another embodiment, the at least one weight element may further include a fourth leg extending along a peripheral edge of the face. The first, second, and third legs may be located on a sole of the body.

According to another aspect, the at least one weight element is located on an outer surface of the sole of the body. One or more additional weight elements may be located elsewhere on the body.

According to a further aspect, the body has an inner cavity defined by an inner surface of the face and an inner surface of the body, and the at least one weight element is located on the inner surface of the body within the inner cavity.

According to a still further aspect, at least a portion of the body is formed of a metallic material, and the at least one weight element is integrally formed with the at least a portion of the body formed of the metallic material.

Still other aspects of the invention relate to an iron-type golf club head that includes an iron-type face having a ball-striking surface configured for striking a ball, and an iron-type golf club body connected to the face and extending rearward from the face. The head also includes at least one weight element integrally formed with the body, such that the head has a total weight that is higher than a target weight of the head. The at least one weight element is configured to be at least partially removed by machining to lower the total weight of the head to approximately equal the target weight.

According to one aspect, the body includes a peripheral wall extending rearward from the face, and the at least one weight element is connected to the peripheral wall.

According to another aspect, the body includes a plurality of peripheral walls extending rearward from the face, and the at least one weight element is connected to at least one of the peripheral walls.

According to a further aspect, the body includes a peripheral wall extending rearward from the face and a rear cavity defined at least in part by an inner surface of the face and the peripheral wall, and the at least one weight element is positioned within the rear cavity. In one embodiment, the peripheral wall is a sole member forming at least a portion of a sole of the head, and the at least one weight element is positioned on a surface of the sole member located within the rear cavity.

According to a still further aspect, at least a portion of the body is formed of a metallic material, and the at least one weight element is integrally formed with the at least a portion of the body formed of the metallic material.

Further aspects of the invention relate to methods that can be used for manufacturing or customizing a golf club head, which is provided with a face configured for striking a ball with an outer surface thereof and a body connected to the face. The method includes providing a golf club head as described above, and removing a portion of the at least one weight element, using a material removal technique, to lower the initial weight of the head to approximately equal the target weight. This can be accomplished by machining the at least one weight element, or other techniques.

According to one aspect, the at least one weight element includes a first leg extending along a heel side of the body, a second leg extending along a toe side of the body, and a third leg extending along a rear side of the body. Machining the at least one weight element entails machining at least one of the first, second, and third legs. In one embodiment, the at least one weight element further includes a fourth leg extending along a peripheral edge of the face, and machining the at least one weight element includes machining at least one of the first, second, third, and fourth legs.

According to another aspect, the at least one weight element is located on an outer surface of the sole of the body. In this case, the at least one weight element is accessible for machining at any time.

According to a further aspect, the body has an inner cavity defined by an inner surface of the face and an inner surface of the body, and the at least one weight element is located on the inner surface of the body within the inner cavity. The method further includes accessing the inner cavity to machine the at least one weight element. In one embodiment, the head is formed of a face frame member including the face and a wall extending rearwardly from the face, and a backbody member connected to the wall of the face frame member and extending rearwardly from the face frame member. In this embodiment, the method further includes connecting the backbody member to the face frame member after machining the at least one weight element. Additionally, the face frame member may be removably connected to the backbody member in the head as provided, and the method may further include removing the face frame member from the backbody member prior to machining the at least one weight element.

According to a still further aspect, at least a portion of the body is formed of a metallic material, and the at least one weight element is integrally formed with the portion of the body formed of the metallic material.

Still further aspects of the invention relate to golf clubs that include a golf club head as described above and a shaft connected to the head. Such a golf club head may be at an initial weight, prior to removal of material from the head, or at approximately the target weight, after removal of the material.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which.

DETAILED DESCRIPTION

Figure 1:
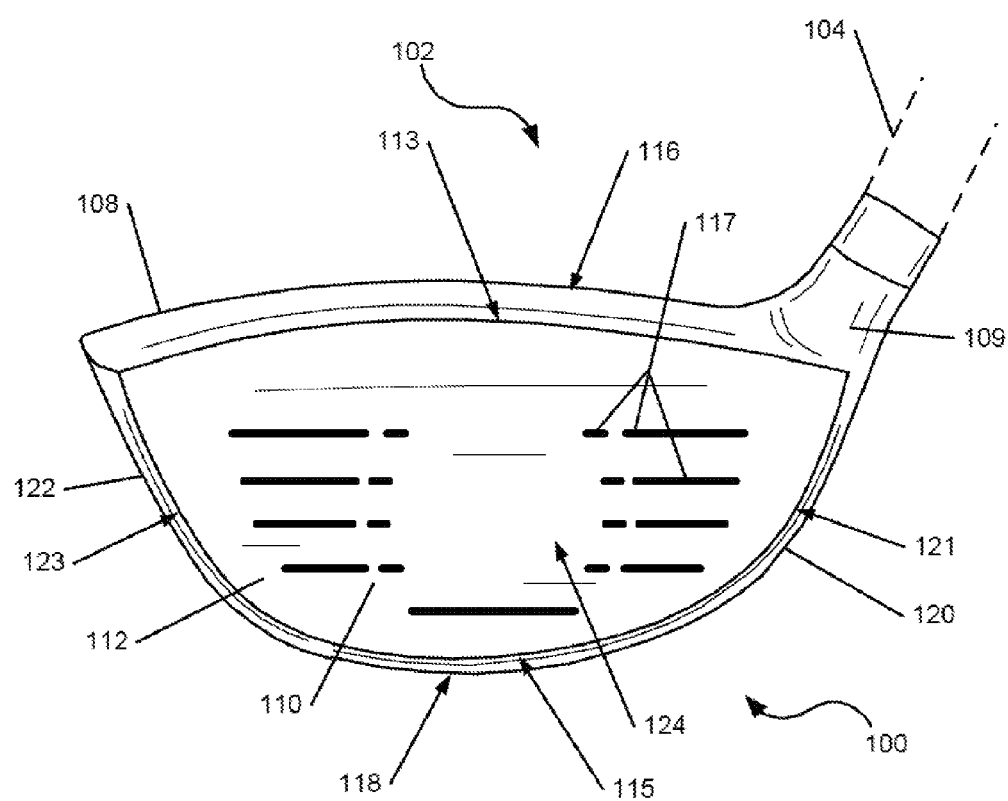
FIG. 1 is a front view of an illustrative embodiment of a head of a wood-type ball striking device according to the present invention.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Ball striking device" means any device constructed and designed to strike a ball or other similar objects (such as a hockey puck). In addition to generically encompassing "ball striking heads," which are described in more detail below, examples of "ball striking devices" include, but are not limited to: golf clubs, putters, croquet mallets, polo mallets, baseball or softball bats, cricket bats, tennis rackets, badminton rackets, field hockey sticks, ice hockey sticks, and the like.

"Ball striking head" means the portion of a "ball striking device" that includes and is located immediately adjacent (optionally surrounding) the portion of the ball striking device designed to contact the ball (or other object) in use. In some examples, such as many golf clubs and putters, the ball striking head may be a separate and independent entity from any shaft or handle member, and it may be attached to the shaft or handle in some manner.

The terms "shaft" and "handle" are used synonymously and interchangeably in this specification, and they include the portion of a ball striking device (if any) that the user holds during a swing of a ball striking device.

"Integral joining technique" means a technique for joining two separate components so that the two components effectively become a single, integral piece, including, but not limited to, irreversible joining techniques, such as adhesively joining, cementing, welding, brazing, soldering, or the like, where separation of the joined pieces cannot be accomplished without structural damage thereto.

"Integrally connected" means connecting two components using an integral joining technique.

"Integrally formed" means one component being formed as a single piece with a second component, often (but not necessarily) from the same material, with little to no discontinuity in material structure between the two components. A non-exhaustive list of examples of processes that can be used for integrally forming two components together include molding, casting, forging, milling/machining from a single piece, and other such techniques.

"Generally parallel" means that a first line, plane, edge, surface, etc. is approximately (in this instance, within 5%) equidistant from another line, plane, edge, surface, etc., over at least 50% of the length of the first line, plane, edge, surface, etc.

In general, aspects of this invention relate to ball striking devices, such as golf club heads, golf clubs, putter heads, putters, and the like. Such ball striking devices, according to at least some examples of the invention, may include a ball striking head and a ball striking surface. In the case of a golf club, the ball striking surface is a substantially flat surface on one face of the ball striking head. Some more specific aspects of this invention relate to wood-type golf clubs and golf club heads, including drivers, fairway woods, wood-type hybrid clubs, and the like, and some aspects of this invention may additionally or alternately be practiced with irons, iron-type hybrid clubs, and the like.

According to various aspects of this invention, the ball striking device may be formed of one or more of a variety of materials, such as metals (including metal alloys), ceramics, polymers, composites (including fiber-reinforced composites), and wood, and may be formed in one of a variety of configurations, without departing from the scope of the invention. In one illustrative embodiment, some or all components of the head, including the face and at least a portion of the body of the head, are made of metal. It is understood that the head may contain components made of several different materials, including carbon-fiber and other components. Additionally, the components may be formed by various forming methods. For example, metal components (such as titanium, aluminum, titanium alloys, aluminum alloys, steels (including stainless steels), and the like) may be formed by forging, molding, casting, stamping, machining, and/or other known techniques. In another example, composite components, such as carbon fiber-polymer composites, can be manufactured by a variety of composite processing techniques, such as prepreg processing, powder-based techniques, mold infiltration, and/or other known techniques.

The various figures in this application illustrate examples of ball striking devices according to this invention. When the same reference number appears in more than one drawing, that reference number is used consistently in this specification and the drawings refer to the same or similar parts throughout.

At least some examples of ball striking devices according to this invention relate to golf club head structures, including heads for wood-type golf clubs, such as drivers, as well as long iron clubs (e.g., driving irons, zero irons through five irons, and hybrid type golf clubs), short iron clubs (e.g., six irons through pitching wedges, as well as sand wedges, lob wedges, gap wedges, and/or other wedges), and putters. Such devices may include a one-piece construction or a multiple-piece construction. Example structures of ball striking devices according to this invention will be described in detail below in conjunction with FIG. 1, which illustrates an example of a ball striking device 100 in the form of a golf driver or other wood-type club, and FIG. 10, which illustrates an example of a ball striking device 400 in the form of an iron-type golf club, in accordance with at least some examples of this invention.

FIGS. 1-5A illustrate a ball striking device 100 in the form of a golf driver, in accordance with at least some examples of this invention, and illustrative embodiments of heads 102 of ball striking devices 100, 200, 300 of this type are shown in FIGS. 1-9A. As shown in FIG. 1, the ball striking device 100 includes a ball striking head 102 and a shaft 104 connected to the ball striking head 102 and extending therefrom. A ball 106 in use is also schematically shown in FIG. 1, in a position to be struck by the ball striking device 100. The ball striking head 102 of the ball striking device 100 of FIG. 1 has a face 112 connected to a body 108, with a hosel 109 extending therefrom. Any desired hosel and/or head/shaft interconnection structure may be used without departing from this invention, including conventional hosel or other head/shaft interconnection structures as are known and used in the art, or an adjustable, releasable, and/or interchangeable hosel or other head/shaft interconnection structure such as those shown and described in U.S. Pat. No. 6,890,269 dated May 10, 2005, in the name of Bruce D. Burrows, U.S. Published Patent Application No. 2009/0011848, filed on Jul. 6, 2007, in the name of John Thomas Stites, et al., U.S. Published Patent Application No. 2009/0011849, filed on Jul. 6, 2007, in the name of John Thomas Stites, et al., U.S. Published Patent Application No. 2009/0011850, filed on Jul. 6, 2007, in the name of John Thomas Stites, et al., and U.S. Published Patent Application No. 2009/0062029, filed on Aug. 28, 2007, in the name of John Thomas Stites, et al., all of which are incorporated herein by reference in their entireties.

For reference, the head 102 generally has a top 116, a bottom or sole 118, a heel 120 proximate the hosel 109, a toe 122 distal from the hosel 109, a front 124, and a back or rear 126. The shape and design of the head 102 may be partially dictated by the intended use of the device 100. In the club 100 shown in FIG. 1, the head 102 has a relatively large volume, as the club 100 is designed for use as a driver or wood-type club, intended to hit the ball accurately over long distances. In other applications, such as for a different type of golf club, the head may be designed to have different dimensions and configurations. When configured as a driver, the club head may have a volume of at least 400 cc, and in some structures, at least 450 cc, or even at least 460 cc. If instead configured as a fairway wood, the head may have a volume of 120 cc to 230 cc, and if configured as a hybrid club, the head may have a volume of 85 cc to 140 cc. Other appropriate sizes for other club heads may be readily determined by those skilled in the art.

Figure 3:
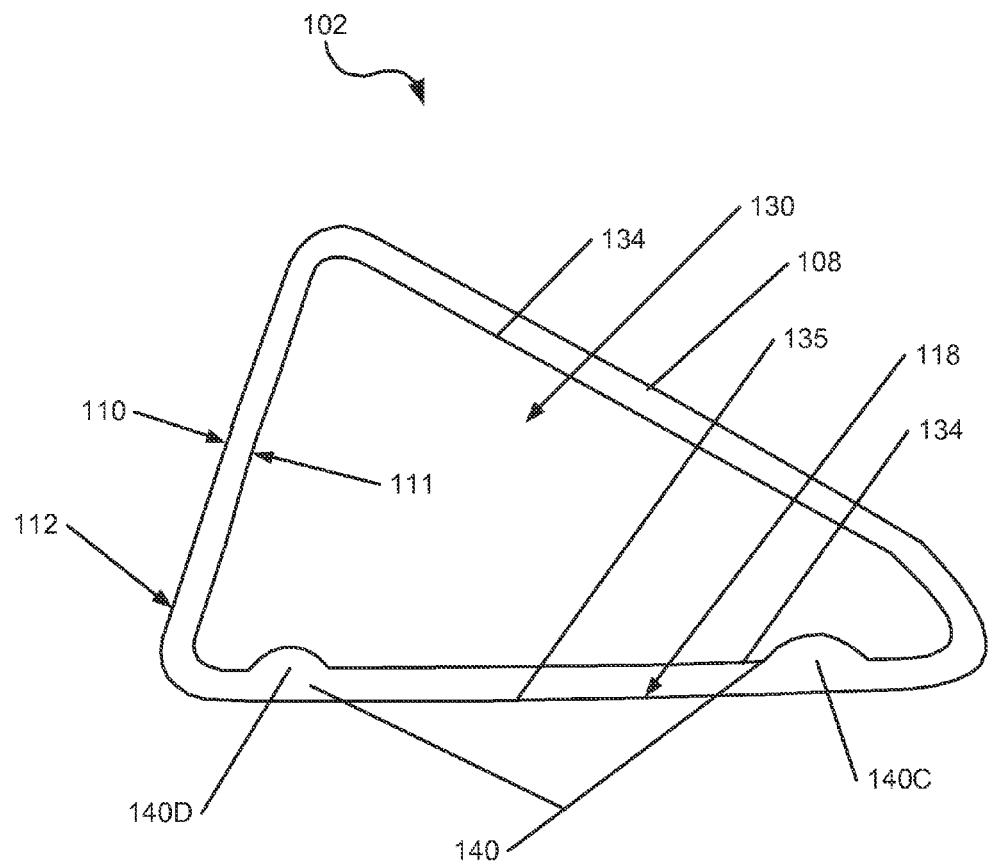
FIG. 3 is a cross-sectional view of the head of FIG. 2, taken along lines 3-3 of FIG. 2.

In the illustrative embodiment illustrated in FIG. 3, the head 102 has a hollow structure defining an inner cavity 130 (e.g., defined by the face 112 and the body 108). Thus, the head 102 has a plurality of inner surfaces defined therein, including an inner face surface 111 and inner body surfaces 134. In one embodiment, the hollow center cavity 130 may be filled with air. However, in other embodiments, the head 102 could be filled with another material, such as foam. In still further embodiments, the solid materials of the head may occupy a greater proportion of the volume, and the head may have a smaller cavity or no inner cavity at all. It is understood that the inner cavity may not be completely enclosed in some embodiments.

Figure 11:
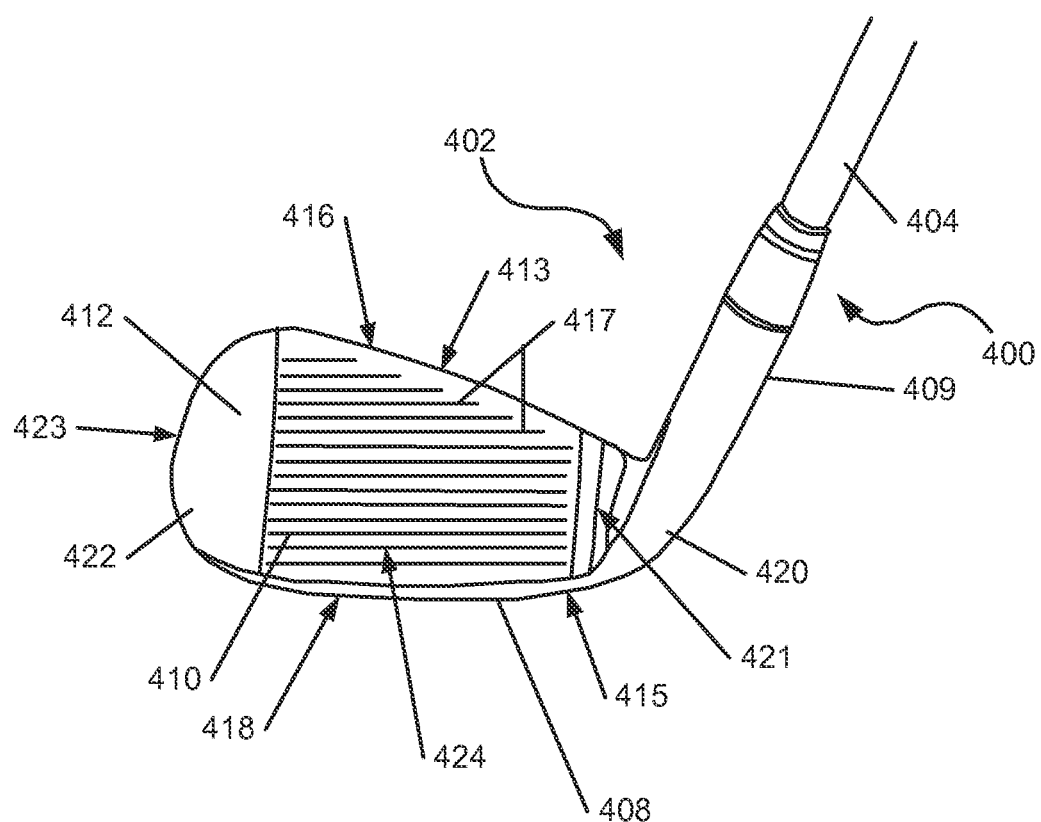
FIG. 11 is a front view of an illustrative embodiment of a head of an iron-type ball striking device according to the present invention.

The face 112 is located at the front 124 of the head 102, and has a ball striking surface 110 located thereon and the inner surface 111 opposite the ball striking surface 110, as illustrated in FIGS. 1 and 11. The ball striking surface 110 is typically an outer surface of the face 112 configured to face a ball 106 in use, and is adapted to strike the ball 106 when the device 100 is set in motion, such as by swinging. As shown, the ball striking surface 110 is relatively flat, occupying most of the face 112. The face 112 has a plurality of outer edges, including a top edge 113, a bottom edge 115, and lateral edges (including heel edge 121 and toe edge 123). The edges of the face may be defined as the boundaries of an area of the face 112 that is specifically designed to contact the ball 106 in use, and may be recognized as the boundaries of an area of the face 112 that is intentionally flattened and smoothed to be suited for ball contact. For reference purposes, the portion of the face 112 nearest the top face edge 113 and the heel 120 of the head 102 is referred to as the "high-heel area"; the portion of the face 112 nearest the top face edge 113 and toe 122 of the head 102 is referred to as the "high-toe area"; the portion of the face 112 nearest the bottom face edge 115 and heel 120 of the head 102 is referred to as the "low-heel area"; and the portion of the face 112 nearest the bottom face edge 115 and toe 122 of the head 102 is referred to as the "low-toe area". Conceptually, these areas may be recognized and referred to as quadrants of substantially equal size (and/or quadrants extending from a geometric center of the face 112), though not necessarily with symmetrical dimensions. The face 112 may include some curvature in the top to bottom and/or heel to toe directions (e.g., bulge and roll characteristics), as is known and is conventional in the art. In other embodiments, the surface 110 may occupy a different proportion of the face 112, or the body 108 may have multiple ball striking surfaces 110 thereon. In the illustrative embodiment shown in FIG. 1, the ball striking surface 110 is inclined slightly (i.e., at a loft angle), to give the ball 106 slight lift and spin when struck. In other illustrative embodiments, the ball striking surface 110 may have a different incline or loft angle, to affect the trajectory of the ball. Additionally, the face 112 may have a variable thickness and/or may have one or more internal or external inserts in some embodiments.

Figure 6:
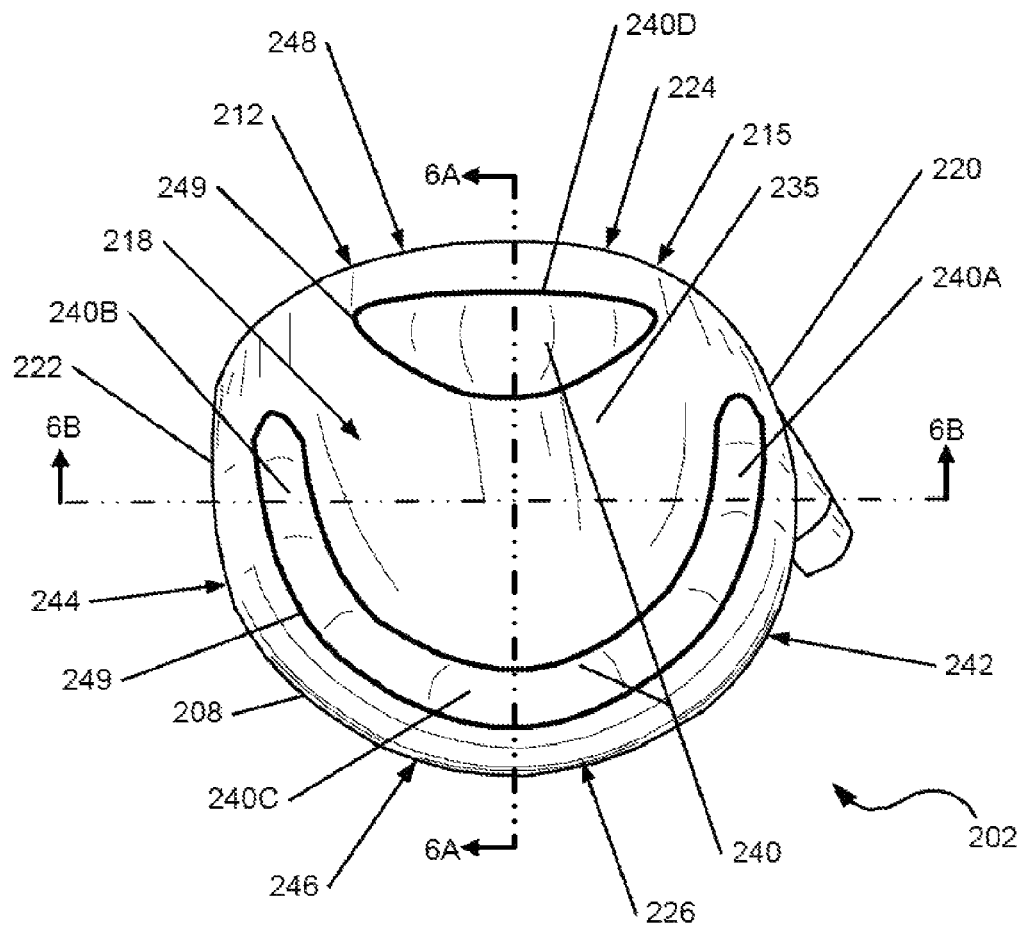
FIG. 6 is a bottom view of a second illustrative embodiment of a head of a wood-type ball striking device according to the present invention.
Figure 6A:
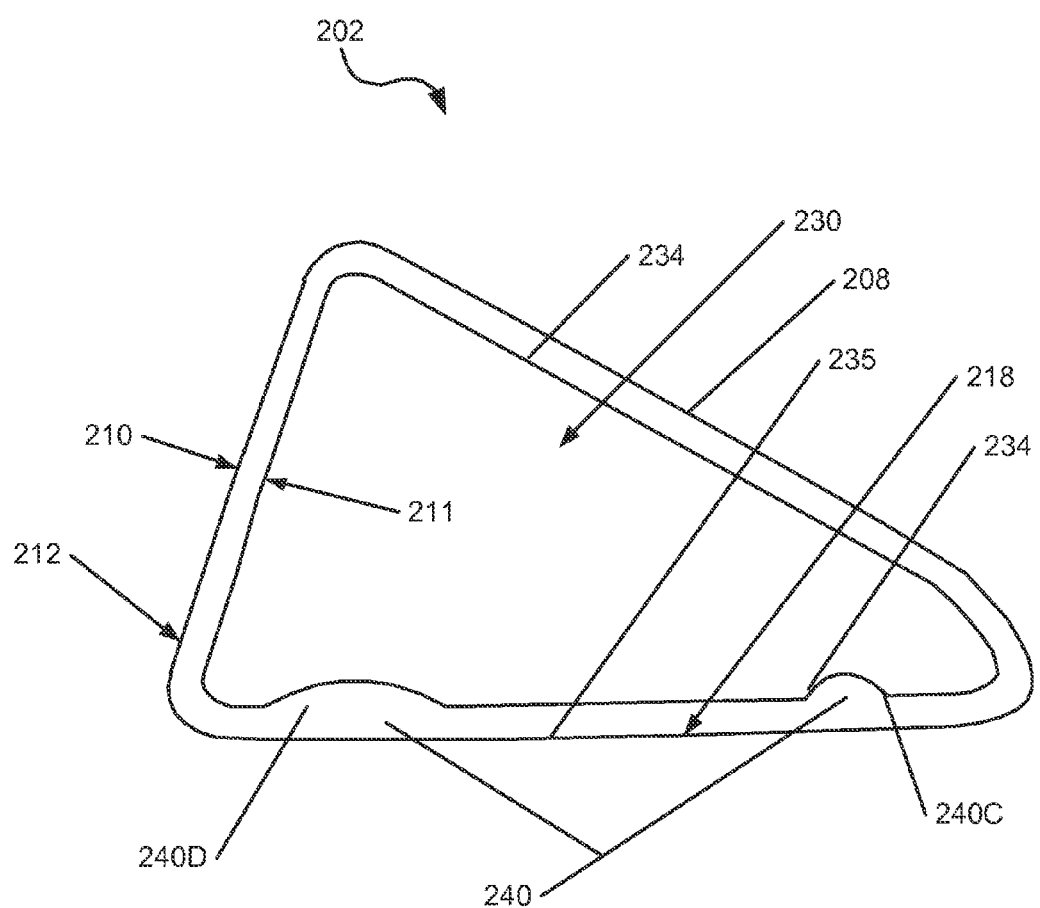
FIG. 6A is a cross-sectional view of the head of FIG. 6, taken along lines 6A-6A of FIG. 6.
Figure 6B:
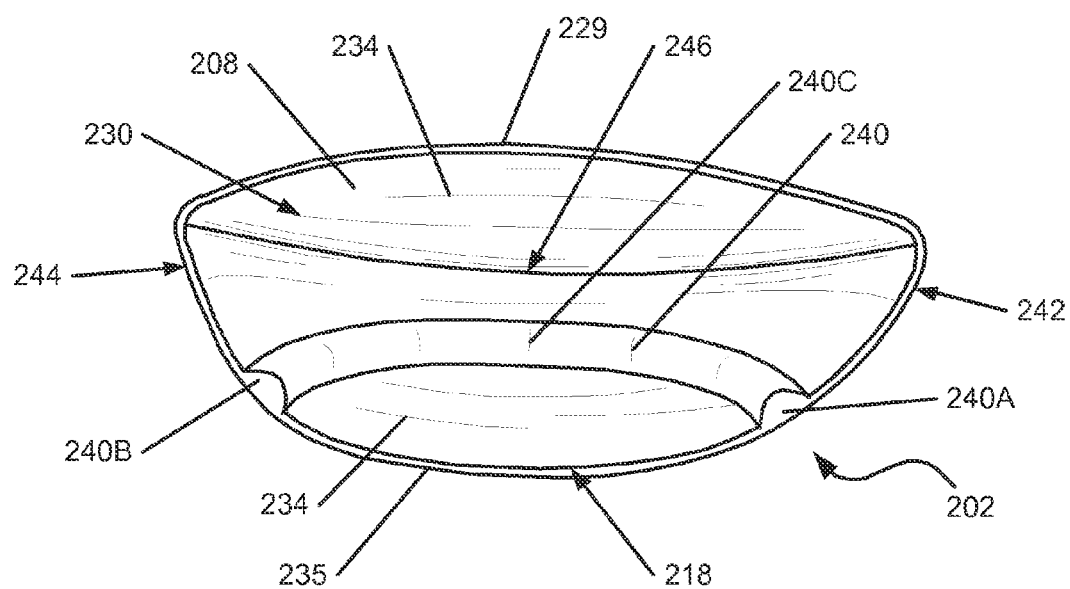
FIG. 6B is a cross-sectional view of the head of FIG. 6, taken along lines 6B-6B of FIG. 6.
Figure 7:
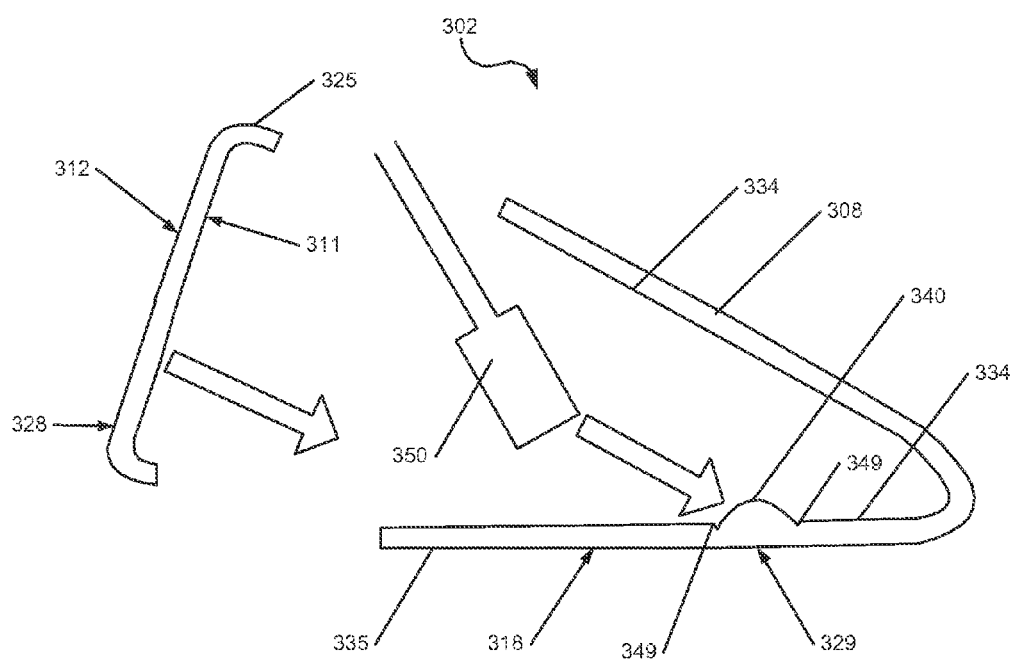
FIG. 7 is an exploded cross-sectional view of a third illustrative embodiment of a head of a wood-type ball striking device according to the present invention, showing schematically the removal of material from the head using a tool.

It is understood that the face 112, the body 108, and/or the hosel 109 can be formed as a single piece or as separate pieces that are joined together. The face 112 may be formed as part of a face frame member, with a wall or walls extending rearward from the edges of the face 112. This configuration is also known as a cup face structure. The embodiment illustrated in FIG. 7 is configured in this way, as described in further detail below, and it is understood that other embodiments may be configured in this way, including the embodiments in FIGS. 1-6B and 8-9A. As shown in FIG. 7, the body 308 can be formed as a separate piece or pieces joined to the walls 325 of the face frame member 328. Additionally, as shown in FIG. 7, the body 308 may be at least partially formed by a backbody member 329, which may be a single piece or multiple pieces. The walls 325 of the face frame member 328 combine with the backbody member 329 to form the body 308 of the head 302. These pieces may be connected by an integral joining technique, such as welding, cementing, or adhesively joining Other known techniques for joining these parts can be used as well, including many mechanical joining techniques, including releasable mechanical engagement techniques. If desired, the hosel 309 may be integrally formed as part of the face frame member 328. Further, a gasket (not shown) may be included between the face frame member 328 and the backbody member 329.

Additionally, in some embodiments, at least a portion of the body 108 can be removable from the head 102 and re-connectable or interchangeable to permit access to the inner cavity 130 of the head 102. Several different configurations for removable and/or interchangeable backbody members are shown and described in U.S. patent application Ser. No. 12/192,402, filed Aug. 15, 2008, which is incorporated by reference herein and made part hereof. As another example, the body 308 may be configured with a removable portion in the form of a door, window, or other similar structure that can be opened to provide access to the interior cavity 330.

Figure 2:
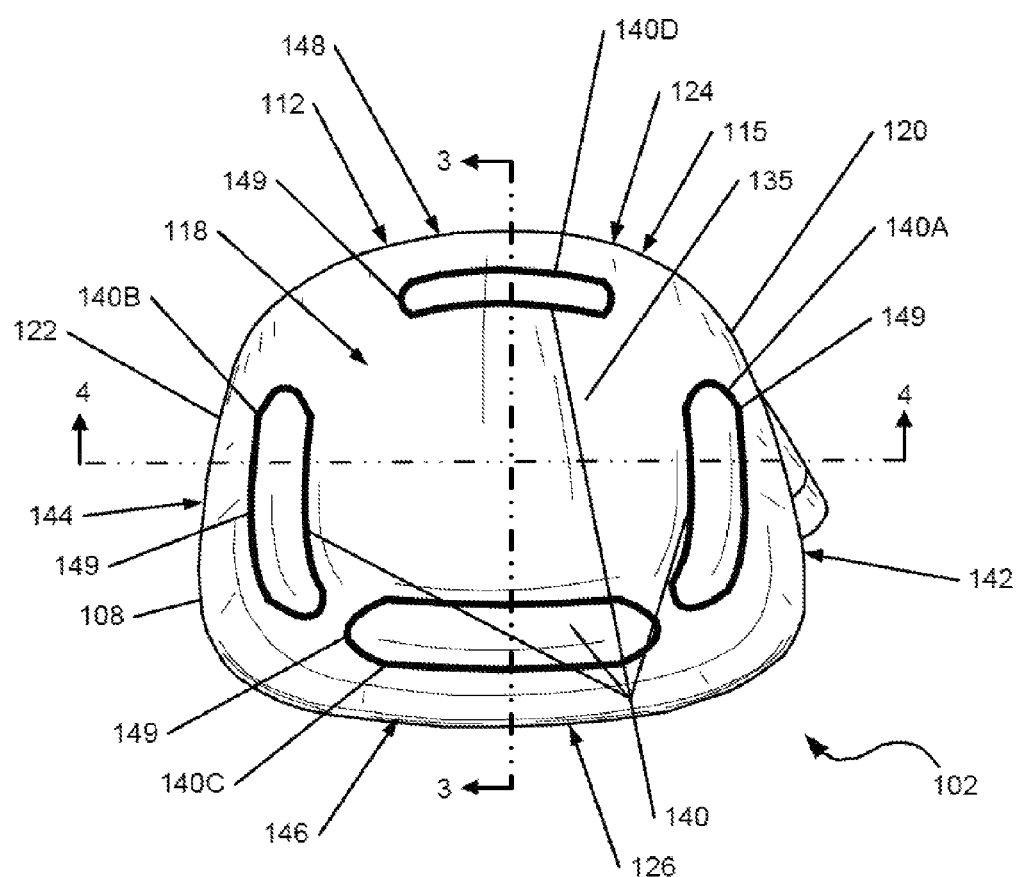
FIG. 2 is a bottom view of the head of FIG. 1.
Figure 4:
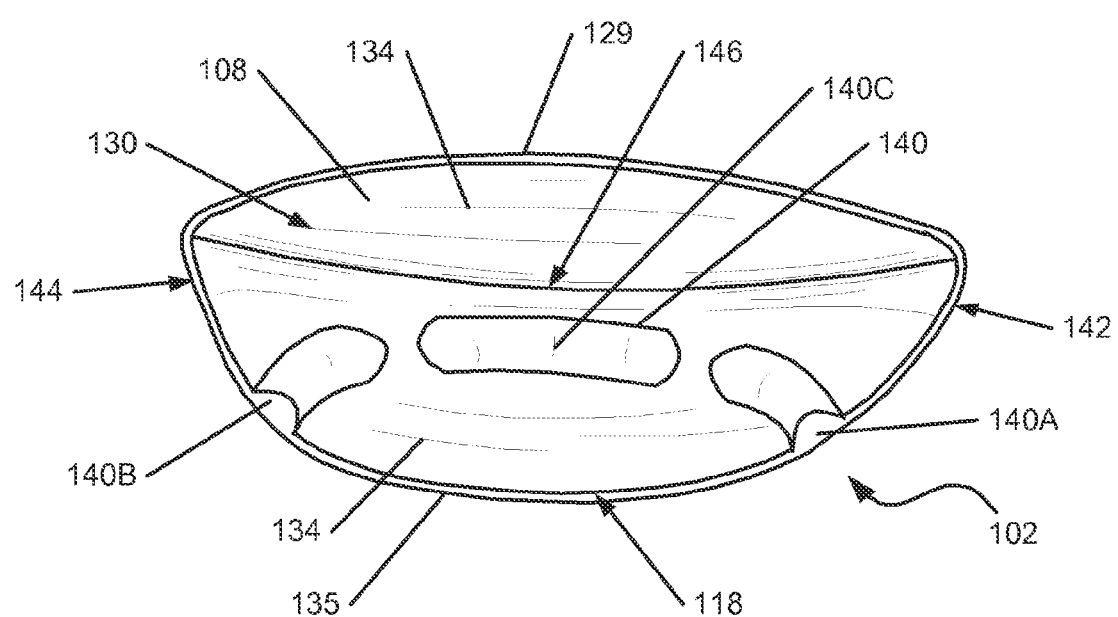
FIG. 4 is a cross-sectional view of the head of FIG. 2, taken along lines 4-4 of FIG. 2.
Figure 5:
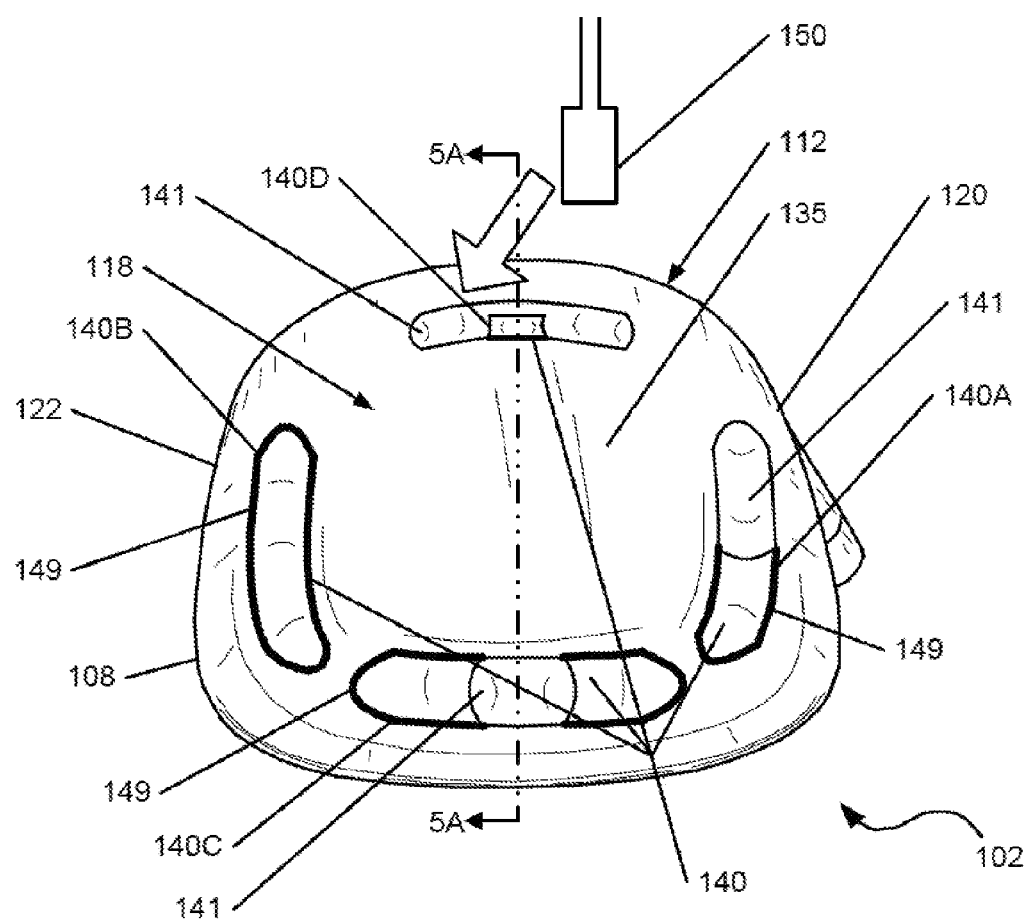
FIG. 5 is a bottom view of the head of FIG. 2, showing schematically the removal of material from the head using a tool.

The body 108 of the head 102 illustrated in FIGS. 1-5A has a generally square rear profile when viewed from the top or bottom, as shown in FIGS. 2 and 5. Other embodiments of wood-type heads may have different shapes or profiles, such as the embodiment of the head 202 illustrated in FIGS. 6-6B, which has a rounded rear profile, or other known configurations of wood-type heads. Other types of heads may have bodies with different configurations, including the iron-type heads described below and shown in FIGS. 10-29.

Figure 10:
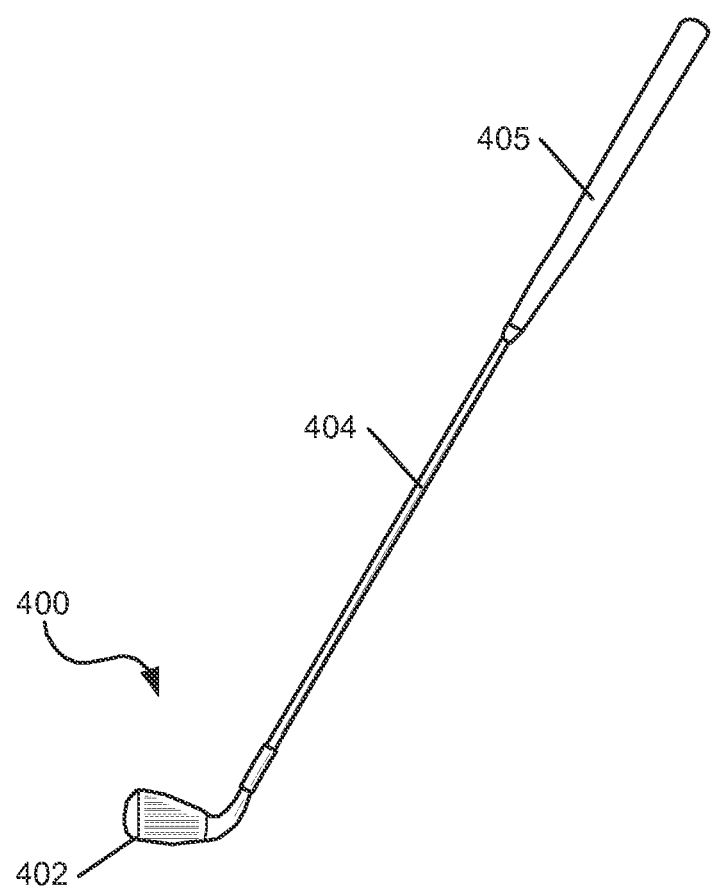
FIG. 10 is a perspective view of an iron-type ball striking device that can be used in connection with aspects of the present invention.

The ball striking device 100 may include a shaft 104 connected to or otherwise engaged with the ball striking head 102, as shown schematically in FIG. 1. The shaft 104 is adapted to be gripped by a user to swing the ball striking device 100 to strike the ball 106. The shaft 104 can be formed as a separate piece connected to the head 102, such as by connecting to the hosel 109, as shown in FIG. 1. In other illustrative embodiments, at least a portion of the shaft 104 may be an integral piece with the head 102, and/or the head 102 may not contain a hosel 109 or may contain an internal hosel structure. Still further embodiments are contemplated without departing from the scope of the invention. The shaft 104 may be constructed from one or more of a variety of materials, including metals, ceramics, polymers, composites, or wood. In some illustrative embodiments, the shaft 104, or at least portions thereof, may be constructed of a metal, such as stainless steel or titanium, or a composite, such as a carbon/graphite fiber-polymer composite. However, it is contemplated that the shaft 104 may be constructed of different materials without departing from the scope of the invention, including conventional materials that are known and used in the art. A grip element (not shown) may be positioned on the shaft 104 to provide a golfer with a slip resistant surface with which to grasp golf club shaft 104. An example of a grip element 405 is shown in FIG. 10 and described below. The grip element may be attached to the shaft 104 in any desired manner, including in conventional manners known and used in the art (e.g., via adhesives or cements, threads or other mechanical connectors, swedging/swaging, etc.).

Generally, club heads 102 according to various embodiments and aspects of the invention contain a weight element or elements connected to the body that is configured to be at least partially removed, such as by machining, to lower the total weight of the head to approximately equal a target weight. The head 102 may contain one or more weight elements distributed across different locations on the head 102, so that portions of the weight elements can be strategically removed to alter the weight distribution, center of gravity, and/or moment of inertia of the head 102.

FIGS. 1-5A illustrate one example embodiment of a wood-type club head 102 according to aspects of the invention. As shown in FIGS. 2-5A, the head 102 has weight elements 140 connected to the body 108, which project inwardly from an inner surface 134 of the sole 118 of the body 108. It is understood that the weight elements 140 of FIGS. 2-5A may be considered to be a single, non-continuous weight element connected to the head 102. The weight elements 140 are formed as a heel leg 140A located along a heel edge 142 of the sole 118, a toe leg 140B located along a toe edge 144 of the sole 118, a rear leg 140C located along a rear edge 146 of the sole 118, and a front leg 140D located along a front edge 148 of the sole 118 and along the bottom edge 115 of the face 112. In this embodiment, each of the legs 140A-D of the weight element 140 is an elongated structure that extends in a direction of elongation generally parallel to the respective edges 142, 144, 146, 148 of the sole 118 and generally follows the inner contours of the body 108. Additionally, each of the legs 140A-D protrudes slightly from the inner surface 134 of the body 108 and has a slightly rounded surface, as shown in FIGS. 3 and 4, and further has rounded points at both ends, giving each of the legs 140A-D a slightly elongated, obround shape. The weight elements 140 are also substantially flush and continuous with the outer surface 135 of the sole 118. In other embodiments, one or more of the legs 140A-D may have a different shape and/or contour. For example, the legs 140A-D may have shapes that distribute weight in other areas of the body 108 to permit greater variation in the weighting options available. As another example, the legs 140A-D may have a more complex surface, including ridges, peaks, valleys, etc.

Figure 8:
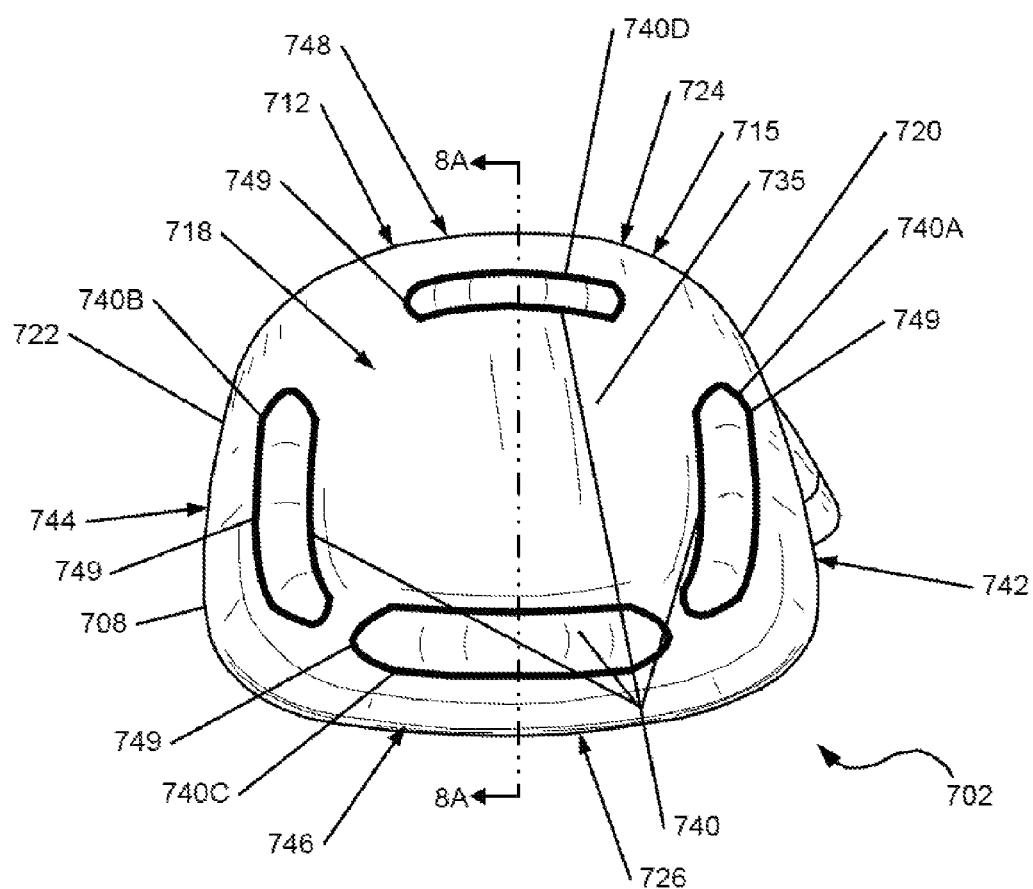
FIG. 8 is a bottom view of a fourth illustrative embodiment of a head of a wood-type ball striking device according to the present invention.
Figure 8A:
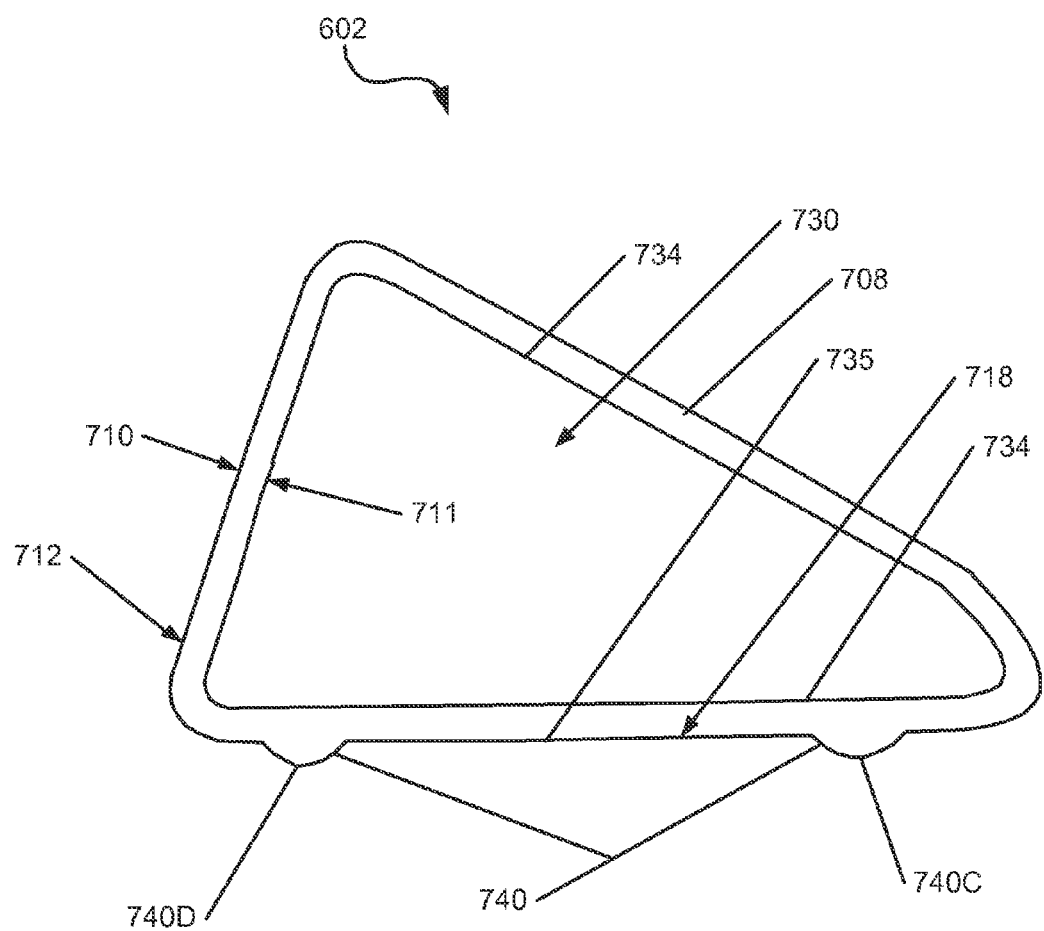
FIG. 8A is a cross-sectional view of the head of FIG. 8, taken along lines 8A-8A of FIG. 8.

In further embodiments, the body 108 may include one or more differently configured weight elements 140, and may contain a different number of weight elements 140 or a weight element 140 with a different number or configuration of legs 140A-D. For example, as described in greater detail below, FIGS. 6-6B illustrate a head 202 that includes a weight element 240 with multiple legs 240A-C joined together to form a single continuous structure. As another example, one or more weight elements could be positioned on the head 102 in other locations on the sole 118, and may protrude from other surfaces besides the inner surface 134 of the sole 118. For example, the weight elements 640 in FIGS. 8-8A are positioned to protrude from the outer surface 635 of the body 608. In another example, one or more weight elements could be positioned on the top 116, rear 126, heel 120, or toe 122 of the head 102, or could even be positioned on the face 112, such as on the inner surface 111 of the face 112. In a further example, a head 102 may include weight elements 140 protruding from both the inner and outer surfaces 134, 135 of the body 108, in any of a variety of different locations. Still further examples are contemplated within the scope of the present invention.

In the embodiment of FIGS. 2-5A, the weight elements 140 are integrally formed with the body 108, such as by molding, forging, machining, and/or other such forming techniques. The body 108 may be formed as a single piece with the weight elements 140, or alternately, the body 108 may be formed of multiple pieces, and the weight elements 140 may be integrally formed with one or more of the pieces. In another embodiment, one or more of the weight elements 140 may be connected to the body separately, such as by integrally connecting the components using welding, brazing, or other integral joining techniques, or other connection techniques.

When the weight elements 140 are integrally formed with at least a portion of the body 108, the integrally formed components will generally be made from the same material. As described above, the body 108 can be made from metallic materials (including metals, metal alloys, metal-matrix composites, and any other metal-based material), ceramics, polymers, other composites (including fiber-reinforced composites), and wood, or a combination of such materials. The weight elements 140 can be made of any of the aforementioned materials, and in some circumstances may not be made from the same materials as the portions of the body 108 to which they are connected. In another embodiment, a weight element 140 may be made from the same material as the adjacent portion of the body 108, but may also include an insert or a filler or doping material to increase the weight of the element 140. In a further embodiment, a weight element 140 may be made from multiple materials and/or the body 108 may contain several weight elements 140 made of different materials from each other. Still further variations and material configurations are possible.

Figure 5A:
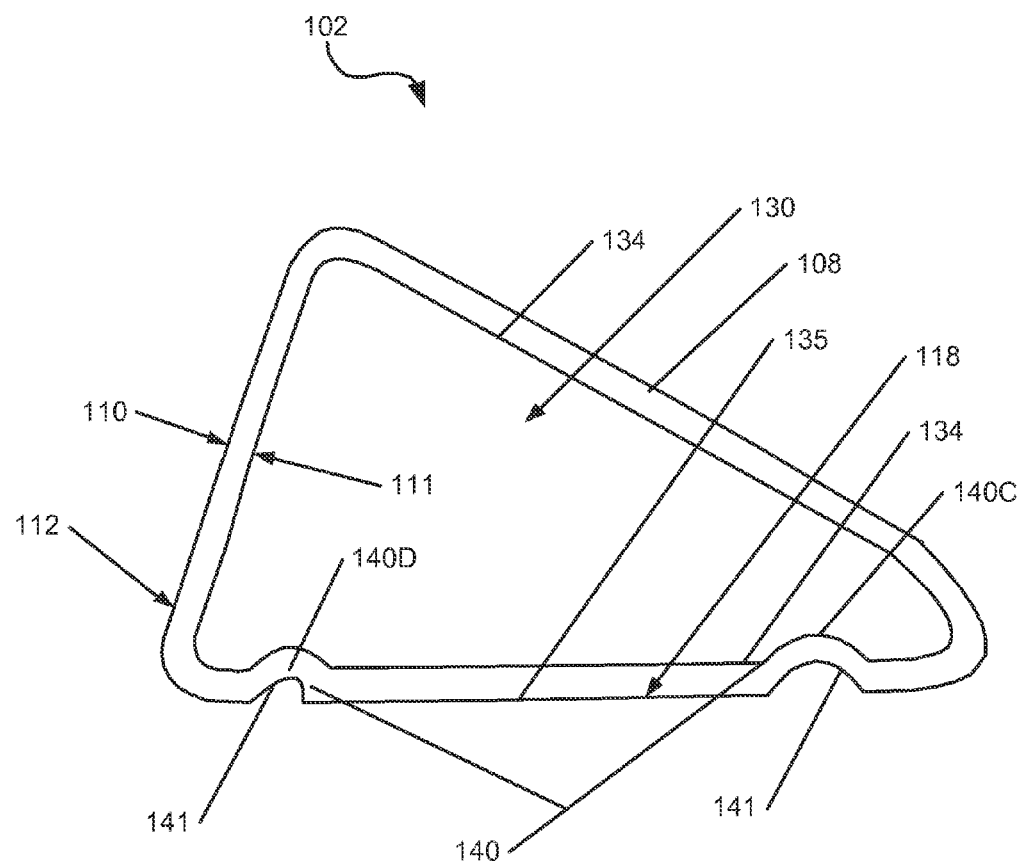
FIG. 5A is a cross-sectional view of the head of FIG. 2, taken along lines 3-3 of FIG. 2, after removal of material as in FIG. 5.

In general, the head 102 is configured so that at least a portion of the weight element 140 can be selectively removed, using a material removal technique, to lower the weight of the head 102 to approximately equal a target weight. In one embodiment, the material removal may be accomplished by machining/milling, such as by the use of a milling tool 150, as described below and shown in FIG. 5. The machining may be performed by a CNC machine or other computer-controlled machining tool, or the machining may alternately be performed by a manual machining apparatus or other machining apparatus or a combination of such techniques. In other embodiments, material can be removed using a different material removal technique, such as electric discharge (EDM) machining, chemical etching, and further material removal techniques The selection of a particular tool and/or material removal technique may depend on the identity and/or properties of the material of the weight element(s) that will be removed. It is understood that a combination of different tools and techniques for material removal may be used to remove material from the weight elements 140. In this embodiment, the material is removed from the outer surface 135 of the head 102, to create recessed portions or recesses 141 on the outer surface 135. The weight elements 140 protruding inward from the inner surface 134 of the body 108 makes material of the body 108 thicker at the weight elements 140. FIGS. 5 and 5A illustrate the recesses 141 created by the removal of material from the weight elements 140 at the outer surface 135 of the body 108. In one embodiment, where applicable and practicable, the material removal is the final step in manufacturing the head 102, prior to attaching the shaft 104 to the head 102. It is understood that in some embodiments, where machining is done on the inside of the head 102, subsequent assembly steps may be performed.

The head 102 can be manufactured at a total weight that is higher than the target weight of the head 102, to compensate for the removal of material. For example, in one embodiment, a wood-type driver may have a target weight of 200 g, and may be configured to contain 10-30 g of additional material that can be removed to reach the target weight. In one embodiment, the head 102 has at least 20 g of discretionary weight that can be removed from the weight elements 140, and in another embodiment, the head 102 is designed to have approximately 30 g of weight removed from the weight elements 140. In this embodiment, the wood-type head 102 can be manufactured at 165 g, with weight elements 140 that total 65 g, making the total weight of the head 230 g. This allows 30 g of material to be removed from the weight elements 140, lowering the weight of the head 102 to the targeted weight of approximately 200 g. In this example, 35 g of the weight elements 140 would remain as part of the body 108. Accordingly, the portions of the weight elements 140 that are removed can be strategically selected to locate the 35 g of additional weight to achieve a specific weight distribution, center of gravity, moment of inertia, etc. of the head 102. By "approximately" in this instance, it is meant that the stated weights have an error or tolerance of +/−5 g. However, in another embodiment, the tolerance of weight of the head 102 may be zero or substantially zero, due to use of accurate and precise machining equipment. It is understood that a large variety of different heads can be constructed and configured with weight elements 140 that are configured to be at least partially removed to reach a target weight, and that any such variations are contemplated within the scope of this invention. For example, in one embodiment, the target weight of a wood-type driver head 102 may be between 195 g and 210 g, and the head 102 may include weight element(s) 102 designed to have 10-30 g of material removed to reach the target weight.

Examples of other such embodiments are described below and shown in FIGS. 6-29. In other embodiments, the initial weight and the target weight of each head embodiment may be different, and that different heads may include different numbers, sizes, and configurations of weight elements. It is also understood that the target weight may, in some circumstances, be informed or dictated by applicable rules and regulations, such as the USGA Rules. If instead the head 102 is configured as a fairway wood, the target weight may be between 215 g and 230 g, and the weight element(s) 140 may be designed to have 10-30 g of material removed to reach the target weight. For example, a fairway wood head 102 may have an initial weight may be 250 g, and the target weight may be approximately 220 g. If the head 102 were instead configured as an iron-type head, such as the heads 402, 502, 602 shown in FIGS. 10-29 and described below, the initial weight may change or vary based on the type of head 402, and the target weight may be approximately 10-30 g lighter than the initial weight. Such target weights may be between approximately 235 g for longer irons to approximately 285 g for shorter irons, and even to approximately 310 g for wedges. Similarly, if the head 102 is configured as a hybrid club head, the initial weight may be 10-30 g heavier than the target weight, which may be between approximately 220 g and 235 g.

The material removal may be performed to achieve a desired shape or contour on one or more of the legs 140A-D of the weight element 140. For example, the machining may be performed so as not to leave any rough or sharp edges on the weight element 140, which can reduce the chance of injury to a user and reduce potential aerodynamic and/or frictional drag on the head 102 during a swing. As another example, the machining may be performed so as to achieve a specific shape or contour, which may be designed to improve the functioning of the head 102, such as to create a shape that improves aerodynamics, frictional properties, and/or the appearance of the head 102, among other improvements.

FIGS. 5-5A illustrate removal of selected portions or segments 152 of the weight elements 140 of the head 102 of FIGS. 1-4 by a machining or milling tool 150. The milling tool 150 may be a CNC machine or other computer-controlled machining tool, or the machining may alternately be performed by a manual machining apparatus or other machining apparatus. As described above, in this embodiment, the material is removed from the outer surface 135 of the head 102 at the weight elements 140, to create recesses 141. The outer surface 135 of the body 108 contains indicia 149 to indicate the areas where material removal is acceptable. Accordingly, the bulk of the weight elements 140 can be hidden on the inner surface 134 of the body 108, while the indicia 149 indicates the proper areas for material removal on the outer surface 135. It is understood that other material removal techniques, or a combination of different tools and techniques, may be used to remove material from the weight elements 140. In one embodiment, material may be removed from the inner surface 334 of the body 308, as illustrated in FIG. 7, rather than the outer surface 335, or may be removed from a combination of both surfaces 334, 335.

As shown in FIG. 5, a large segment 152 of the front leg 140D is removed, constituting the majority of the mass of the front leg 140D, shifting the center of gravity further toward the rear 126 of the head 102. Additionally, a large segment 152 of the heel leg 140A is removed, and none of the toe leg 140B is removed, shifting the center of gravity toward the toe 122 of the head 102. Further, a central segment 152 of the rear leg 140C is removed, shifting the weight distribution more toward the heel and toe edges 120, 122 of the head 102, increasing the moment of inertia of the head. Those skilled in the art can readily recognize a large variety of different strategies for material removal from the weight elements 140 in order to achieve a desired weight distribution, center of gravity, and/or moment of inertia. It is understood that material removal may not necessarily involve removal of the entire segments 152 of the weight elements 140, as illustrated in FIG. 5, and the depth of the material removal may vary.

Additionally, as mentioned above, the body 108 may contain indicia to identify the weight elements 140 and/or to guide the machining of the weight elements 140, so as not to inadvertently cause structural damage to the head 102. In the embodiment of FIGS. 2-5A, the weight elements 140 are surrounded by visible indicia in the form of a visible border 149 that marks the boundaries of the weight elements 140 that are suitable for machining. In this embodiment, the visible border 149 is created by paint, pigment, ink, dye, or other applied visible substance. It is understood that the visible substance may be selectively visible, such as being visible only under UV light. The visible border 149 may also be created in another manner, such as by a ridge, recess, etching, engraving, or embossing surrounding the weight elements 140, for example. In another embodiment, a different type of indicia may be used to identify the weight elements 140. For example, the weight elements could be visually or contextually distinct from the other portions of the body 108, such as by having a different coloration, a different surface finish or texture, or other such distinctive appearance, or the weight elements 140 could protrude from the body 108 in a manner that clearly indicates the boundaries of the weight elements 140. A different coloration may be achieved by paint, pigment, ink, dye, or other applied visible substance. The body 108 may further contain some indicia indicating how much material can or should be removed from the weight elements 140 to achieve the target weight, or an indication of the target weight itself. This can take the form of a numerical indication or code imprinted somewhere on the body 108 or elsewhere, for example. Still other types of indicia can be used for these purposes in further embodiments.

FIGS. 6-6B illustrate another example embodiment of a wood-type club head 202 according to aspects of the invention. The head 202 of FIGS. 6-6B has many features in common with the head 102 described above and shown in FIGS. 1-5A. Accordingly, many common components between the head 102 of FIGS. 1-5A and the head 202 are referred to using similar reference numerals in FIGS. 6-6B and the description that follows, using the "200" series of reference numerals. The head 202 of FIGS. 6-6B has a body 208 with a rounded rear 226, in contrast with the head 102 of FIGS. 1-5A, which has a generally squared body 108. It is understood that the features and aspects described herein with respect to the heads 102, 202 of FIGS. 1-5A can be used or adapted for use in other wood-type heads having different configurations.

As shown in FIGS. 6-6B, the head 202 has two weight elements 240 connected to the body 208, protruding from the inner surface 234 of the sole 218 of the body 208 and substantially flush and continuous with the outer surface 235 of the body 208. It is understood that the weight elements 240 of FIGS. 6-6B may be considered to be a single, non-continuous weight element connected to the head 202. One of the weight elements 240 is formed as a heel leg 240A located along a heel edge 242 of the sole 218, a toe leg 240B located along a toe edge 244 of the sole 218, and a rear leg 240C located along a rear edge 246 of the sole 218, with the heel leg 240A, the toe leg 240B, and the rear leg 240C all connected together continuously to form a U-shaped structure extending along the heel edge 242, the toe edge 244, and the rear edge 246 of the sole 218. Another weight element 240 is separate from the U-shaped element 240 and is formed as a front leg 240D located along a front edge 248 of the sole 218 and along the bottom edge 215 of the face 212. The front leg 240A is an elongated structure that extends in a direction of elongation generally parallel to the front edge 248 of the sole 118. Additionally, in the embodiment shown in shown in FIGS. 6-6B, each of the legs 240A-D protrudes slightly from the body 208 and has a smooth, rounded, protruding surface facing inwardly from the inner surface 234 of the body 208. The U-shaped weight element 240 has rounded points at the ends of the heel leg 240A and the toe leg 240B. The front leg 240D is substantially triangular in shape, with tapered ends, a greater width around the center of the leg 240D, and rounded corners. Further, in the embodiment of FIGS. 6-6B, the weight elements 240 are integrally formed with at least the adjacent portions of the body 208, as similarly discussed above. Still further examples are contemplated within the scope of the present invention, including any other embodiments and variations described herein.

In the embodiment of FIGS. 6-6B, the head 202 is configured so that at least a portion of the weight elements 240 can be removed, such as by machining on the outer surface 235 of the body 208, as described above. The head 202 is formed with a weight that is higher than the target weight of the head 202, so that material of the weight elements 240 can be removed to change the weight of the head 202 to approximately equal the target weight, as also described above. The head 202 also has a visible indicia 249 on the outer surface 235 of the body 208 identifying the boundaries of the weight element 240, in the form of paint, pigment, ink, dye, or other applied visible substance. The continuous U-shaped weight element 240 formed of legs 240A-C provides a large variety of different weighting configurations. As described above, the material can be removed from the weight elements 240 to change the weighting of the head, such as to adjust the weight distribution, the center of gravity, and/or the moment of inertia of the head 202.

FIG. 7 illustrates another example embodiment of a wood-type club head 302 according to aspects of the invention. The head 302 of FIG. 7 has many features in common with the heads 102, 202 described above and shown in FIGS. 1-6B. Accordingly, many common components between the heads 102, 202 of FIGS. 1-6B and the head 302 are referred to using similar reference numerals in FIG. 7 and the description that follows, using the "300" series of reference numerals. The head 302 of FIG. 7 has a body 308 with a rounded rear 326, similarly to the head 202 of FIGS. 6-6B.

Additionally, the head 302 is formed of a face frame member 328 and a backbody member 329 connected to the face frame member 328, as described above. The backbody member 329, which may be a single piece or multiple pieces, is connected to the walls 325 of the face frame member 328 to form the body 308 of the head 302. These pieces may be connected by an integral joining technique, such as welding, cementing, or adhesively joining, as well as other known techniques for joining, as described above. In one embodiment, the face frame member 328 may be removably connected to the backbody member 329. Further, the hosel 309 is connected to the face frame member 328, and may be integrally formed with the face frame member 328. Still further, a gasket (not shown) may be included between the face frame member 328 and the backbody member 329. It is understood that the features and aspects described herein with respect to the head 302 of FIG. 7 can be used or adapted for use in other wood-type heads having different configurations, including the heads 102, 202 of FIGS. 1-6B, and that the features of these respective embodiments can be combined together.

As shown in FIG. 7, the head 302 has a weight element 340 connected to the body 308, protruding from the inner surface 334 of the body 308, similarly to the weight elements 140, 240 described above. In the embodiment of FIG. 7, the weight element 340 is integrally formed with at least the adjacent portions of the body 308, as similarly discussed above. Additionally, the head 302 is configured so that at least a portion of the weight element 340 can be removed, such as by machining, by removing material from the inner surface 334 of the body 308, instead of or in addition to removing material from the outer surface 335 of the body 308. FIG. 7 illustrates removal of material from the weight element 340 on the inner surface 334 of the body 308 by a machining or milling tool 150, prior to connecting the face frame member 328 to the backbody member 329. This permits a user to customize the head 302 as desired, and then to complete the assembly of the head 302 by joining the face frame member 328 to the backbody member 329, such as by welding. In another embodiment, the face frame member 328 may be removably connected to the backbody member 329, as described above, and the face frame member 328 may be removed in order to permit access to the interior cavity 330 to remove material from the weight element 340, and then later re-connected. In a further embodiment, a portion of the face 312 or the body 308 may be removable to provide access to the weight element 340 after assembly of the head 302. For example, the body 308 may be configured with a removable portion, as described above, or with a door, window, or other similar structure that can be opened to provide access to the interior cavity 330. As described above, the material can be removed from the weight element 340 to change the weighting of the head, such as to adjust the weight distribution, the center of gravity, and/or the moment of inertia of the head 302.

The head 302 also has a visible border 349 identifying the weight element 340. In this embodiment, the visible border 349 is in the form of a channel that extends around the periphery of the weight element 340. As shown in FIG. 7, the channel 349 is indented into the inner surface 334 of the body 308 to provide visual identification. The channel 349 may also include a paint, pigment, ink, dye, or other applied visible substance to provide additional visibility.

FIGS. 8-8A illustrate another example embodiment of a wood-type club head 702 according to aspects of the invention. The head 702 of FIGS. 8-8A has many features in common with the heads 102, 202, 302 described above and shown in FIGS. 1-7. Accordingly, many common components between the heads 102, 202, 302 of FIGS. 1-7 and the head 702 are referred to using similar reference numerals in FIGS. 8-8A and the description that follows, using the "700" series of reference numerals. The head 702 of FIGS. 8-8A has a body 708 with a generally squared rear 726, similarly to the head 102 of FIGS. 2-5A. It is understood that the features and aspects described herein with respect to the head 702 of FIGS. 8-8A can be used or adapted for use in other wood-type heads having different configurations, including the heads 102, 202, 302 of FIGS. 1-7, and that the features of these respective embodiments can be combined together.

As shown in FIG. 8, the head 702 has a weight element 740 connected to the body 708 and integrally formed with at least the adjacent portions of the body 708, as similarly discussed above. The head 702 has weight elements 740 formed of a heel leg 740A, a toe leg 740B, a rear leg 740C, and a front leg 740D in an arrangement similar to the weight elements 140 of the head 102 of FIGS. 2-5A. However, the weight elements 740 in the embodiment of FIGS. 8-8A protrude from the outer surface 735 of the body 708, rather than the inner surface 734 as in the embodiments described above. Additionally, the head 702 is configured so that at least a portion of the weight element 740 can be removed, such as by machining, by removing material from the outer surface 734 of the body 708. For example, the protruding portions of the weight elements 740 can be shaved partially or completely away. It is understood that the machining of the weight elements 740 can be considered to create a recessed portion, even if the resultant weight element 740 is substantially flush with adjacent areas of the sole 718. The machining may further create indented recesses in the outer surface 735 of the body 708. Material can be removed using a tool 150 as similarly shown in FIG. 5. In another embodiment, one or more weight elements may have portions protruding from both the inner and outer surfaces 734, 735 of the body 708, and such protruding portions may partially or wholly overlap in at least some places. The head 702 also has visible indicia 749 identifying the weight elements 740. In this embodiment, the visible indicia 749 is in the form of a paint, pigment, ink, dye, or other applied visible substance that extends around the periphery of the weight elements 740. In a further embodiment, the weight elements 740 may need no applied visible indicia 749, as the portions protruding from the outer surface 735 of the body 708 offer clearly defined areas for material removal.

Figure 9:
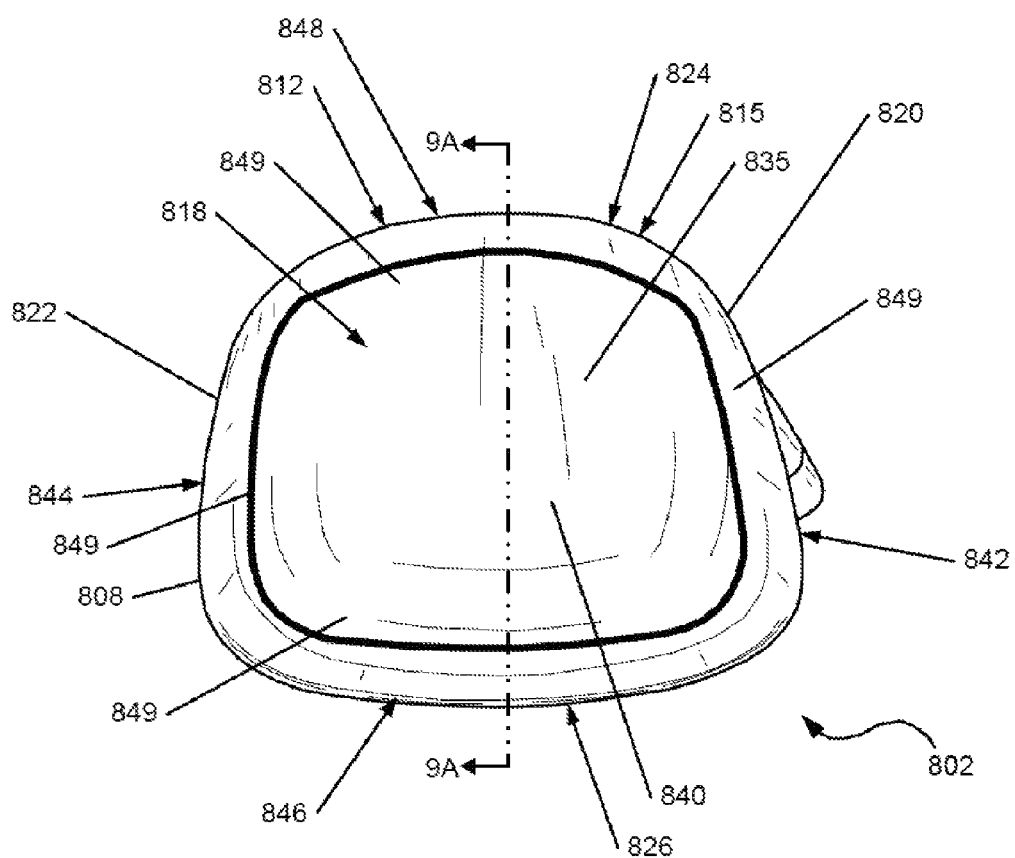
FIG. 9 is a bottom view of a fifth illustrative embodiment of a head of a wood-type ball striking device according to the present invention.
Figure 9A:
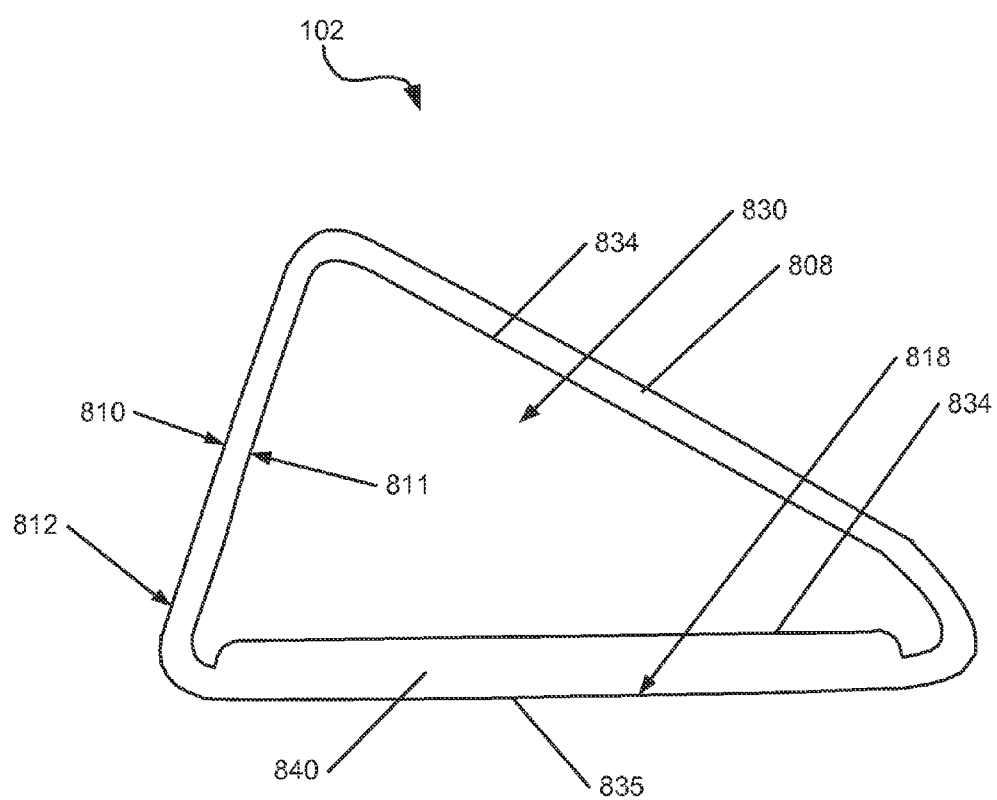
FIG. 9A is a cross-sectional view of the head of FIG. 9, taken along lines 9A-9A of FIG. 9.

FIGS. 9-9A illustrate another example embodiment of a wood-type club head 802 according to aspects of the invention. The head 802 of FIGS. 9-9A has many features in common with the heads 102, 202, 302, 702 described above and shown in FIGS. 1-8A. Accordingly, many common components between the heads 102, 202, 302, 702 of FIGS. 1-8A and the head 802 are referred to using similar reference numerals in FIGS. 9-9A and the description that follows, using the "800" series of reference numerals. The head 802 of FIGS. 9-9A has a body 808 with a generally squared rear 826, similarly to the head 102 of FIGS. 2-5A. It is understood that the features and aspects described herein with respect to the head 802 of FIGS. 9-9A can be used or adapted for use in other wood-type heads having different configurations, including the heads 102, 202, 302, 702 of FIGS. 1-8A, and that the features of these respective embodiments can be combined together.

As shown in FIGS. 9-9A, the head 802 has a weight element 840 connected to the body 808 and integrally formed with at least the adjacent portions of the body 808, as similarly discussed above. The weight element 840 in FIGS. 9-9A is formed of a single weight pad on the inner surface 834 of the sole 818, covering a majority of the area of the sole 818. The head 802 is configured so that at least a portion of the weight element 840 can be removed, such as by machining, by removing material from the outer surface 834 of the body 808, as described above. The expansive weight element 840 of FIGS. 9-9A provides a "canvas" for material removal that offers greater options and configurations for material removal, as the weight element 840 does not have complex boundaries that confine the area of permitted material removal. Accordingly, material can be removed from nearly any portion of the outer surface 835 of the sole 818, in nearly any desired configuration, to create a desired weighting of the head 802. Material can be removed using a tool 150 as similarly shown in FIG. 5, and creates recesses or recessed portions in the outer surface 835, as also described above. The head 802 also has visible indicia 849 identifying the weight element 840 and the boundaries of the area that is suitable for material removal. In this embodiment, the visible indicia 849 is in the form of a paint, pigment, ink, dye, or other applied visible substance that extends around the periphery of the weight element 840. It is understood that the weight element 840 may be designed to have 10-30 g of material removed, similarly to the embodiments described above.

FIGS. 10-13 illustrate a ball striking device 400 in the form of a golf iron, in accordance with at least some examples of this invention, and illustrative embodiments of heads 402, 502, 602 of ball striking devices 400 of this type are shown in FIGS. 10-17. The head 402 of FIGS. 10-13 has many features in common with the heads 102, 202, 302, 702, 802 described above and shown in FIGS. 1-9A. Accordingly, many common components between the heads 102, 202, 302, 702, 802 of FIGS. 1-9A and the head 402 are referred to using similar reference numerals in FIGS. 10-13 and the description that follows, using the "400" series of reference numerals. The ball striking device 400 includes a shaft 404 and an iron-type golf club head 402 attached to the shaft 404. The golf club head 402 of FIG. 10 may be representative of any iron or iron-type hybrid golf club head in accordance with examples of the present invention.

As shown in FIGS. 10-13, the golf club head 402 includes a body member 408 having a face 412 and a hosel 409 extending from the body 408 for attachment of the shaft 404. For reference, the head 402 generally has a top 416, a bottom or sole 418, a heel 420 proximate the hosel 409, a toe 422 distal from the hosel 409, a front 424, and a back or rear 426. The shape and design of the head 402 may be partially dictated by the intended use of the device 400. The heel portion 420 is attached to and/or extends from a hosel 409 (e.g., as a unitary or integral one piece construction, as separate connected elements, etc., including any connection configurations described above).

The face 412 is located at the front 424 of the head 402, and has a ball striking surface 410 located thereon and an inner surface 411 opposite the ball striking surface 410. The ball striking surface 410 is typically an outer surface of the face 412 configured to face a ball (not shown) in use, and is adapted to strike the ball when the device 400 is set in motion, such as by swinging. As shown, the ball striking surface 410 is relatively flat, occupying most of the face 412. The ball striking surface 410 may include grooves 452 (e.g., generally horizontal grooves 452 extending across the face 412 in the illustrated example) for the removal of water and grass from the face 412 during a ball strike. Of course, any number of grooves, desired groove patterns, and/or groove constructions may be provided (or even no groove pattern, if desired), including conventional groove patterns and/or constructions, without departing from this invention.

For reference purposes, the portion of the face 412 nearest the top face edge 413 and the heel 420 of the head 402 is referred to as the "high-heel area"; the portion of the face 412 nearest the top face edge 413 and toe 422 of the head 402 is referred to as the "high-toe area"; the portion of the face 412 nearest the bottom face edge 415 and heel 420 of the head 402 is referred to as the "low-heel area"; and the portion of the face 412 nearest the bottom face edge 415 and toe 422 of the head 402 is referred to as the "low-toe area". Conceptually, these areas may be recognized and referred to as quadrants of substantially equal size (and/or quadrants extending from a geometric center of the face 412), though not necessarily with symmetrical dimensions. The face 412 may include some curvature in the top to bottom and/or heel to toe directions (e.g., bulge and roll characteristics), as is known and is conventional in the art. In other embodiments, the surface 410 may occupy a different proportion of the face 412, or the body 408 may have multiple ball striking surfaces 410 thereon. As seen in the illustrative embodiment shown in FIG. 13, the ball striking surface 410 is inclined (i.e., at a loft angle), to give the ball an appreciable degree of lift and spin when struck. In other illustrative embodiments, the ball striking surface 410 may have a different incline or loft angle, to affect the trajectory of the ball. Additionally, the face 412 may have a variable thickness and/or may have one or more internal or external inserts in some embodiments. It is understood that the face 412, the body 408, and/or the hosel 409 can be formed as a single piece or as separate pieces that are joined together.

The body member 408 of the golf club head 402 may be constructed from a wide variety of different materials, including materials conventionally known and used in the art, such as steel, titanium, aluminum, tungsten, graphite, polymers, or composites, or combinations thereof. Also, if desired, the club head 402 may be made from any number of pieces (e.g., having a separate face plate, etc.) and/or by any construction technique, including, for example, casting, forging, welding, and/or other methods known and used in the art.

In the embodiment shown in FIGS. 10-13, the body 408 of the head 402 includes a rear cavity 430 located behind the face 412, which is defined at least partially by the rear surface 411 of the face 412. As shown in FIGS. 10-13, the body 408 further includes a sole body member 431 extending rearward from the bottom edge 415 of the face 412 and defining a portion of the rear cavity 430. The rear cavity 430 may also be partially defined by peripheral or perimeter walls 433 extending rearward from the peripheral edges of the face 412, including the top edge 413, the heel edge 417, and the toe edge 419 of the face 412. It is understood that the sole member 431, or a portion thereof, may be considered to be a peripheral wall 433 as defined herein. The peripheral walls 433 follow the curvilinear contour of the body 408, and form an opening to the rear cavity 430 defined by the peripheral walls 433, including the sole member 431. In this embodiment, the sole member 431 forms at least part of the sole 418 of the head 402. Additionally, the sole member 431 has an inner surface 434 that in part defines the rear cavity 430 and an outer surface 435 that forms at least a portion of a sole surface on the sole 418 of the head 402. In additional embodiments, such as the embodiments illustrated in FIGS. 14-29, the head 402 may have a differently configured sole member and/or a rear wall, or may not contain some of these components. For example, in the embodiment shown in FIGS. 14-15, the head 502 has a rear wall 532 extending upward from the rear of the sole member 531 and partially defining the rear cavity 530, and in the embodiment shown in FIGS. 16-29, the head 603 is a traditional blade-type iron configuration, and contains no rear cavity unless the head 603 is machined in order to create a rear cavity.

The ball striking device 400 may include a shaft 404 connected to or otherwise engaged with the ball striking head 402, as shown schematically in FIGS. 10-11. The shaft 404 may be connected and configured as described above with respect to FIG. 1. As described above, FIG. 10 illustrates a grip element 405 connected to the shaft 404.

The iron-type ball striking heads 402, 502, 602 in FIGS. 10-29 described below are all configured with at least one weight element 440, 540, 640 that is configured to be at least partially removed, using a material removal technique, to adjust the weighting of the head. As described above, these heads 402, 502, 602 are manufactured with weights higher than the target weight, so that a specified amount of material can be removed to reach the target weight. This material can be removed in various different configurations, which can change the weight distribution, center of gravity, and/or moment of inertia of the head 402, 502, 602 in different ways. In one embodiment, the heads 402, 502, 602 may be manufactured 10-30 g overweight, so that approximately 10-30 g of material may be removed to reach the target weight. The configurations, features, and components of the embodiments of FIGS. 10-29 may be used in any of a large number of different iron-type clubs, including long irons, short irons, wedges, and any other iron-type club, and it is understood that different types of clubs may have different target weights. Accordingly, the manufactured weight of the head 402, 502, 602 may depend on the type of iron that it is. Additionally, a set of iron-type clubs may be created, with each club having a weight element as described in one or more of the embodiments of FIGS. 10-29. In such a set, each club may be manufactured overweight (e.g., approximately 10-30 g overweight), with each club having a different manufactured weight and target weight, and with each club head being configured for removal of material to reach its specific target weight. Such a set may also include a mix of iron-type clubs with heads 402, 502, 602 as shown in FIGS. 10-29, and may also include one or more wood type clubs described above as shown in FIGS. 1-9A. It is understood that not every club of the set may be configured for material removal as described herein.

Figure 12:
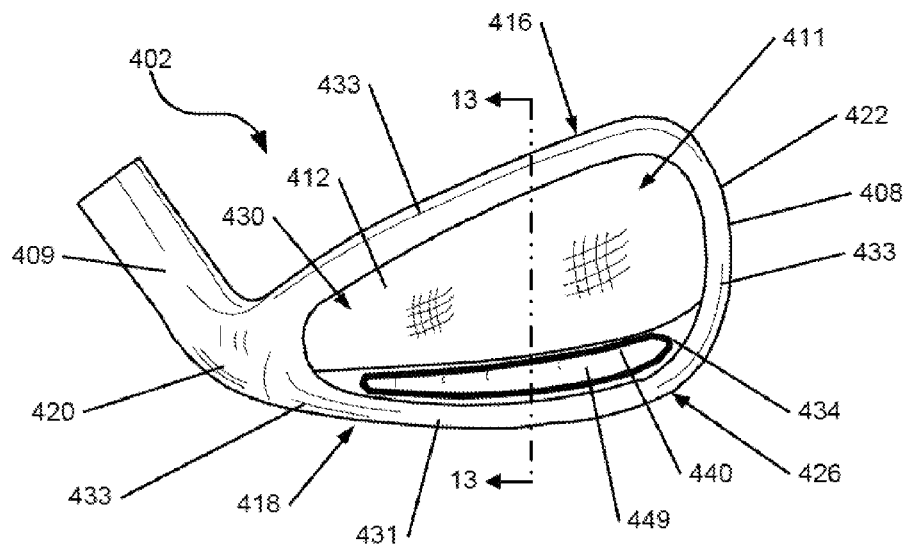
FIG. 12 is a rear view of the head of FIG. 11.
Figure 13:
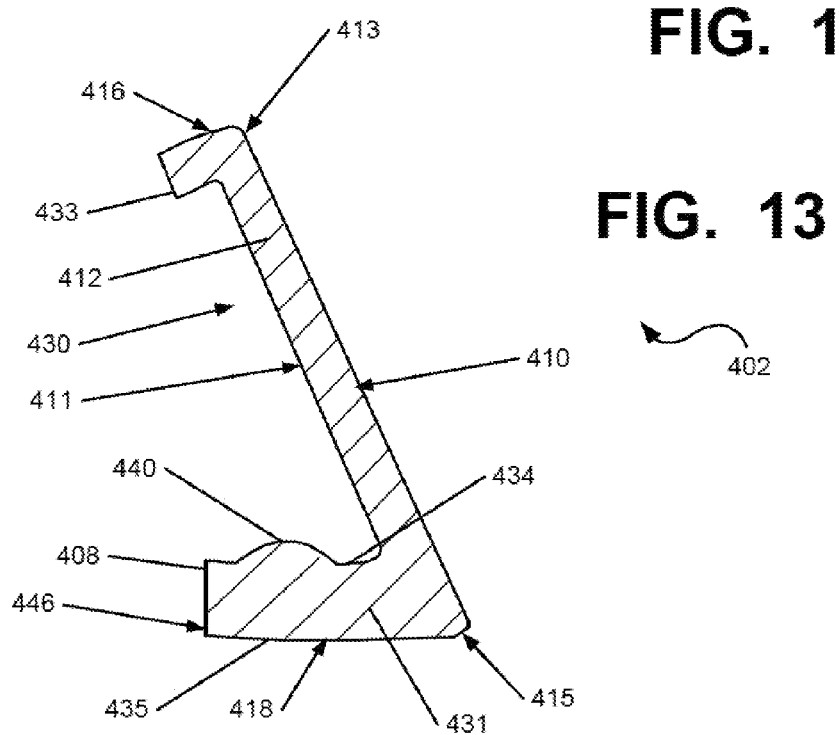
FIG. 13 is a cross-sectional view of the head of FIG. 12, taken along lines 13-13 of FIG. 12.

FIGS. 11-13 illustrate an example embodiment of an iron-type club head 402 including a weight element 440 according to aspects of the invention. As described above, the head 402 of FIGS. 11-13 has a body 408 with a rear cavity 430 defined by the sole member 431 and the other peripheral walls 433 extending rearwardly from the face 412, as well as the inner surface 411 of the face 412. In one embodiment, the head 402 includes one or more weight elements 440 located on one or more of the members or surfaces defining the rear cavity 430, including the sole member 431, the other peripheral walls 433, and/or the inner surface 411 of the face 412. In the embodiment shown in FIGS. 12-13, the head 402 includes a weight element 440 on the inner surface 434 of the sole member 431, located within the rear cavity 430. The weight element 440 is an elongated structure that extends in a direction of elongation generally parallel to the inner surface 411 of the face 412 and to the rear edge 446 of the sole member 431. Additionally, in the embodiment shown in shown in FIGS. 11-13, the weight element 440 protrudes slightly from the body 408, having a smooth, rounded, protruding surface, and the ends of the weight element 440 are rounded. Further, in the embodiment of FIGS. 11-13, the weight element 440 is integrally formed with at least the adjacent portions of the body 408, as similarly discussed above. It is understood that material may be removed from the weight element 440 by machining the inner surface 434 and/or the outer surface 435 of the sole member 431, as described above. Still further examples are contemplated within the scope of the present invention, including any other embodiments and variations described herein.

Figure 15:
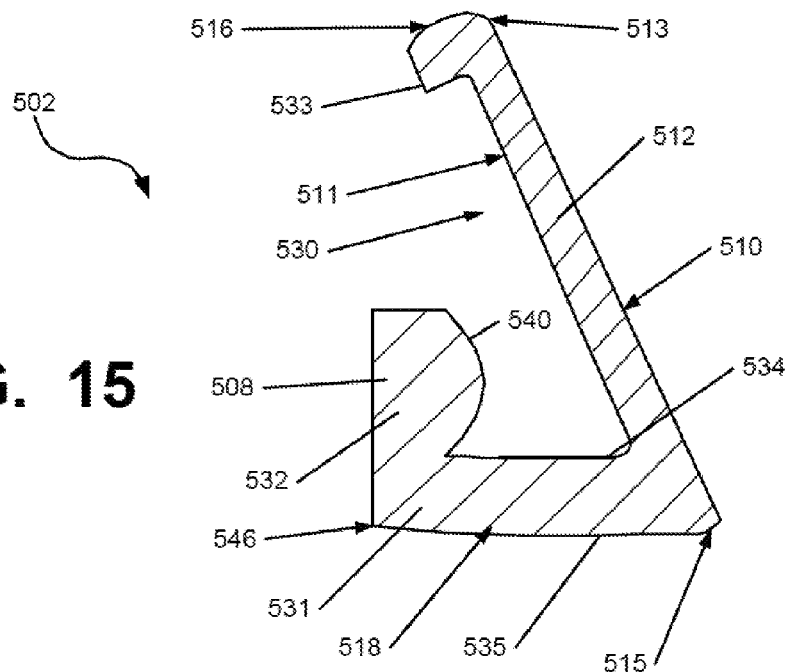
FIG. 15 is a cross-sectional view of the head of FIG. 14, taken along lines 15-15 of FIG. 14.
Figure 14:
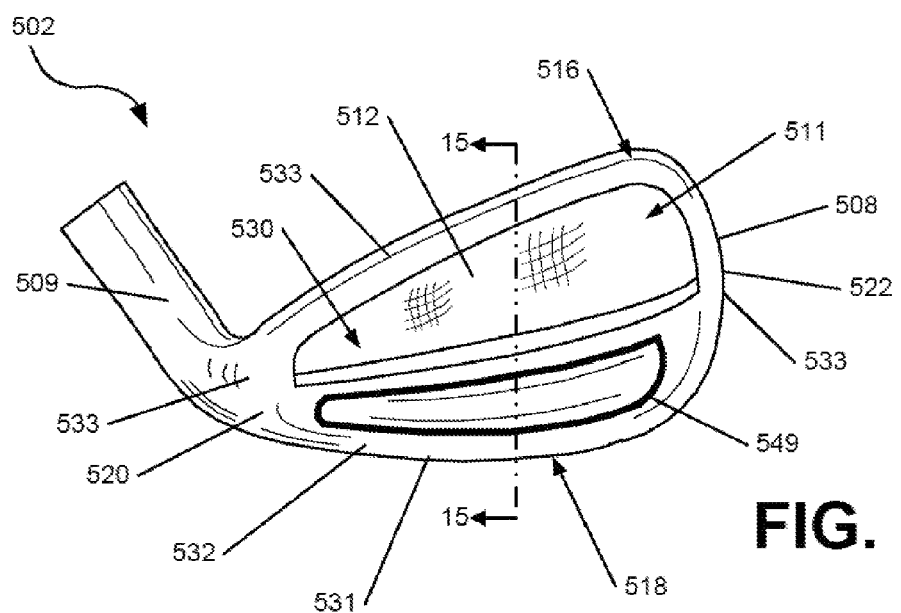
FIG. 14 is a rear view of another illustrative embodiment of a head of an iron-type ball striking device according to the present invention.
Figure 16:
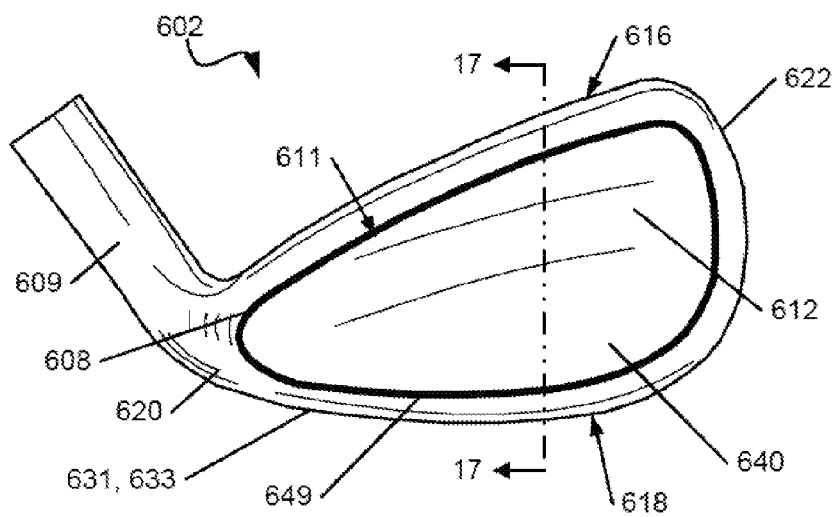
FIG. 16 is a rear view of another illustrative embodiment of a head of an iron-type ball striking device according to the present invention.
Figure 17:
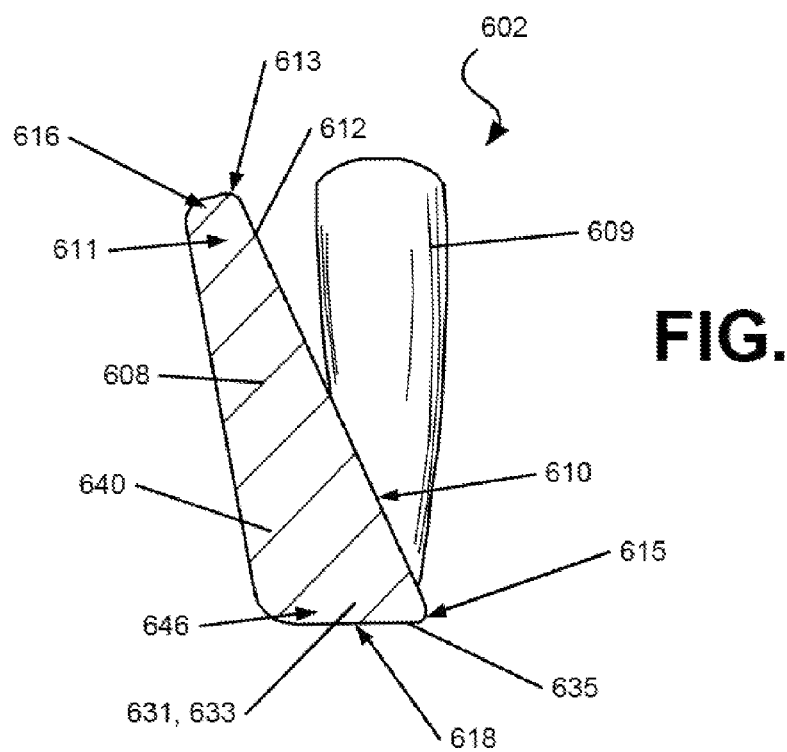
FIG. 17 is a cross-sectional view of the head of FIG. 16, taken along lines 17-17 of FIG. 16.

FIGS. 14-15 illustrate another example embodiment of an iron-type club head 502 including a weight element 540 according to aspects of the invention. The head 502 of FIGS. 14-15 has many features in common with the heads 102, 202, 302, 402 described above and shown in FIGS. 1-13. Accordingly, many common components between the heads 102, 202, 302, 402, 702, 802 of FIGS. 1-13 and the head 502 are referred to using similar reference numerals in FIGS. 14-15 and the description that follows, using the "500" series of reference numerals. As described above, the head 502 of FIGS. 14-15 has a body 508 with a rear cavity 530 defined by the sole member 531 and the other peripheral walls 533 extending rearwardly from the face 512, as well as the inner surface 511 of the face 512 and the rear wall 532 extending upward from the sole member 531. In one embodiment, the head 502 includes one or more weight elements 540 located on one or more of the members or surfaces defining the rear cavity 530, including the sole member 531, the other peripheral walls 533, the inner surface 511 of the face 612, and/or the rear wall 532. In the embodiment shown in FIGS. 14-15, the head 502 includes a weight element 540 on the inner surface of the rear wall 532, located within the rear cavity 530. The weight element 540 is an elongated structure that extends in a direction of elongation generally parallel to the inner surface 511 of the face 512 and to the rear edge 546 of the sole member 531, similarly to the weight element 440 shown in FIGS. 12-13. Additionally, in the embodiment shown in shown in FIGS. 14-15, the weight element 540 protrudes slightly from the body 508 and has a smooth, rounded, protruding surface, and the ends of the weight element 540 are rounded, also similarly to the weight element 440 shown in FIGS. 12-13. Further, in the embodiment of FIGS. 14-15, the weight element 540 is integrally formed with at least the adjacent portions of the body 508, as similarly discussed above. In another embodiment, the rear wall 532 may have one or more additional weight elements formed on the inner and/or outer surfaces thereof, and the sole member 531 may additionally or alternately have one or more weight elements formed thereon. It is understood that material may be removed from the weight element 540 by machining the inner surface and/or the outer surface of the rear wall 532. The outer surface of the rear wall 532 includes visible indicia 549 to form a border of the area where the weight element 540 can be safely machined. In this embodiment, the visible indicia is in the form of a paint, pigment, ink, dye, or other applied visible substance. Still further examples are contemplated within the scope of the present invention, including any other embodiments and variations described herein.

FIGS. 16-29 illustrate another example embodiment of an iron-type club head 602 including a weight element 640 according to aspects of the invention. The head 602 of FIGS. 16-29 has many features in common with the heads 102, 202, 302, 402, 502, 702, 802 described above and shown in FIGS. 1-15. Accordingly, many common components between the heads 102, 202, 302, 402, 502, 702, 802 of FIGS. 1-15 and the head 602 are referred to using similar reference numerals in FIGS. 16-29 and the description that follows, using the "600" series of reference numerals. As described above, the head 602 of FIGS. 16-29 is a traditional blade-type iron head with a solid body and no rear cavity. The head 602 may still be considered to have a sole member 631 and peripheral walls 633 extending rearward from the face 612, and the inner surface 611 of the face 612 may also be considered to be a rear surface of the body 608. In one embodiment, the head 602 includes one or more weight elements 640 located on one or more of the sole member 631, the other peripheral walls 633, and/or the rear surface 611 of the body 608. In the embodiment shown in FIGS. 16-29, the head 602 includes a weight element 640 on the rear surface 611 of the body 608, integrally formed with the body 608. The weight element 640 in this embodiment contains little or no protruding portion, and is formed by a thickened portion of the body 608 of the club head 602. In other words, the body 608 is manufactured overweight, so that the head has a higher overall weight than the target weight of the head 602, and material can be removed from the body 608 to adjust the weight of the head 602 to the target weight. In this embodiment, the body 608 is configured to have material removed from the rear surface 611 of the body 608, and contains visible indicia 649 forming a boundary of an area that is configured for material to be safely removed therefrom. In this embodiment, the visible indicia 649 is in the form of a paint, pigment, ink, dye, or other applied visible substance that extends around the periphery of the weight element 640. Like the embodiment of the head 802 in FIGS. 9-9A, the weight element 640 forms a single weight pad that provides a "canvas" that offers greater options and configurations for material removal, as the weight element 640 does not have complex boundaries that confine the area of permitted material removal. Accordingly, material can be removed from nearly any portion of the rear surface 611 of the body 608, in nearly any desired configuration, to create a desired weighting of the head 602. In another embodiment, material can additionally or alternately be removed from a different portion of the body 608, including from the peripheral walls 633 and/or the outer surface 635 of the sole 618. It is understood that the weight element 640 may be designed to have 10-30 g of material removed, similarly to the embodiments described above, and the overall weight of the head 602 may be adjusted according to the target weight of the head 602.

Figure 18:
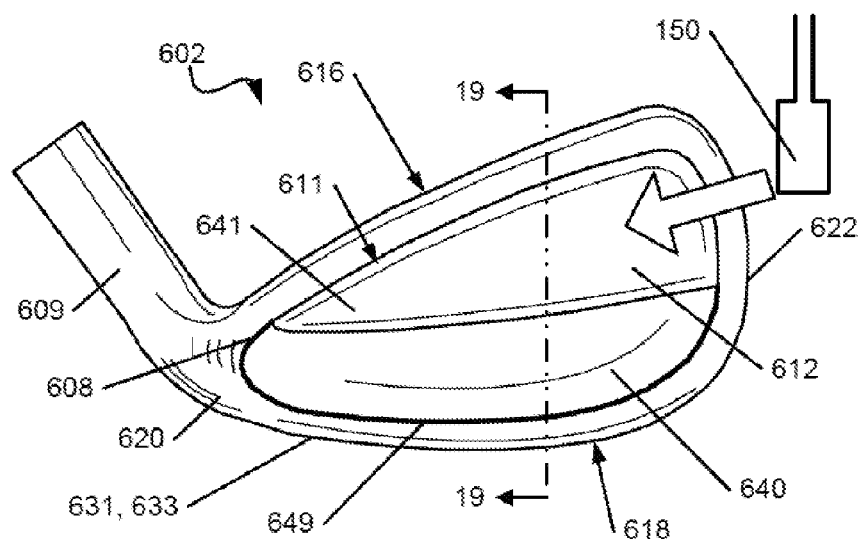
FIG. 18 is a rear view of the head of FIG. 16, showing schematically the removal of material from the head using a tool.
Figure 19:
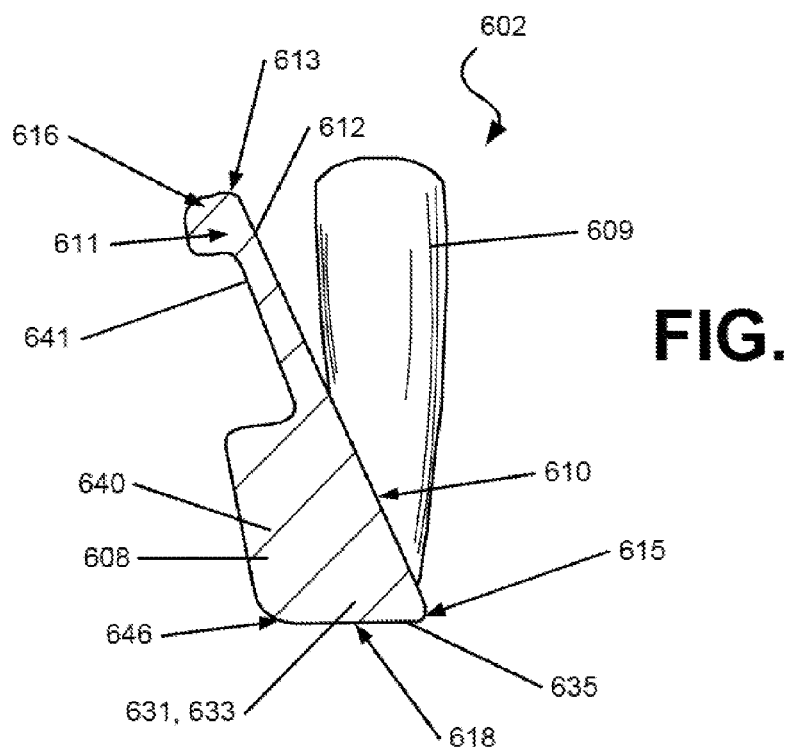
FIG. 19 is a cross-sectional view of the head of FIG. 17, after removal of material as shown in FIG. 18.

FIG. 18 illustrates removal of material from the weight element 640 on the rear surface 611 of the body 608, using a tool 150 as similarly described above and shown in FIG. 5, creating one or more recesses or recessed portions 641 on the rear surface 611 of the body 608. In this embodiment, the material is removed from the top half of the body 608, in order to lower the center of gravity of the head 602 and distribute the weight of the head 602 more toward the sole 618. This creates a recess 641 in the rear surface 611 of the body 608, as shown in FIGS. 18-19, which can be considered a rear cavity as described above. The head 602 of FIGS. 18-19 provides a number of other options for material removal. Some examples of material removal configurations which may be used in accordance with this embodiment or similar embodiments are described below and shown in FIGS. 20-29. The heads 602 shown in FIGS. 20-29 each include a weight element 640 in the form of a weight pad, as shown in FIGS. 18-19, which includes two or more sections 654 that are configured for removal, such as by a milling or machining tool 150 as shown in FIG. 18. In this embodiment, the boundaries of the sections 654 are marked by visible indicia 649, although in other embodiments, one or more of the sections 654 may not be marked or may be only partially marked by visible indicia 649. The visible indicia 649 may be in the form of indentations, ridges, embossings, or other such surface features.

Figure 20:
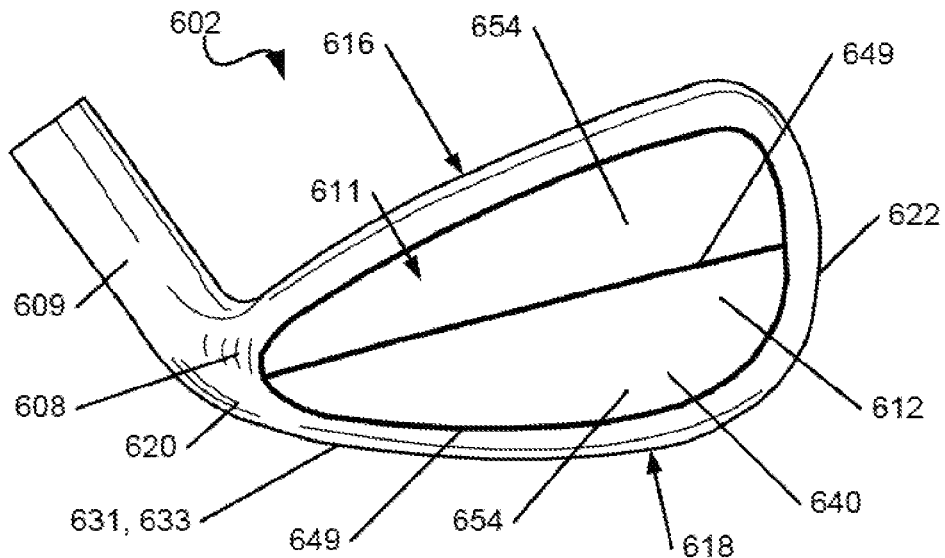
FIG. 20 is a rear view of another illustrative embodiment of a head of an iron-type ball striking device according to the present invention.

The head 602 in FIG. 20 has a weight element 640 with two sections 654 arranged vertically and divided by a generally horizontal boundary indicia 649. The head 602 in FIG. 21 has a weight element 640 with two sections 654 arranged horizontally and divided by a generally vertical boundary indicia 649. The head 602 of FIG. 24 has a weight element 640 with four sections 654 arranged as quadrants of substantially equal sizes and divided by boundary indicia 649. The head 602 of FIG. 25 has a weight element 640 with eight sections 654 of substantially equal sizes and divided by boundary indicia 649. The head 602 of FIG. 26 has a weight element 640 with eight sections 654 arranged as four inner quadrants of substantially equal sizes and four outer quadrants of substantially equal sizes, divided by boundary indicia 649 including an elliptical boundary. The head 602 of FIG. 27 has a weight element 640 with twelve sections 654 arranged as four inner quadrants of substantially equal sizes and eight outer sections, divided by boundary indicia 649 including an elliptical boundary. It is understood that the boundary indicia 649 defining the inner quadrants in FIGS. 26-27 may have a different size and/or a different shape, such as circular, rectangular, etc. Each section 654 of the weight elements 640 in the heads 602 of FIGS. 20-29 may be sized and dimensioned to have a specified weight, so that a person who plans to remove weight from the weight element 640 can accurately determine how much material will be removed during a particular machining process. In one embodiment, all of the sections 654 may have substantially equal weights. Additionally, the head 602 may be configured so that removal of a specified number of sections 654 of the weight element 640 will bring the head 602 to the target weight. For example, in one embodiment, removal of one of the two sections 654 of the heads 602 of FIG. 20 or 21 may bring the head 602 to the target weight. As another example, in one embodiment, removal of two of the sections 654 of the heads 602 of FIGS. 24-27 may bring the head 602 to the target weight. Other configurations and examples are contemplated, including configurations using the embodiments of FIGS. 20-29, as well as other embodiments.

Figure 21:
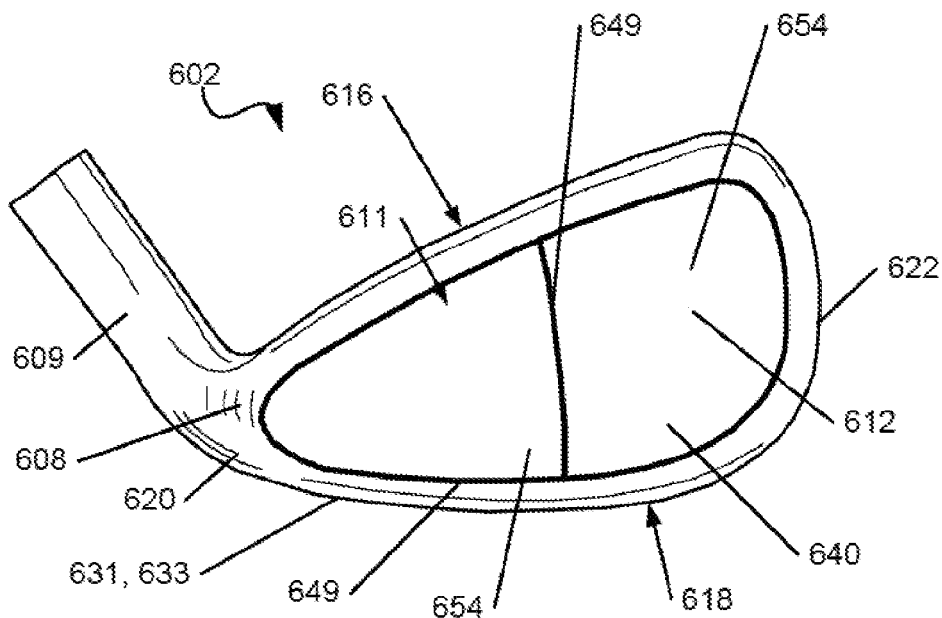
FIG. 21 is a rear view of another illustrative embodiment of a head of an iron-type ball striking device according to the present invention.
Figure 22:
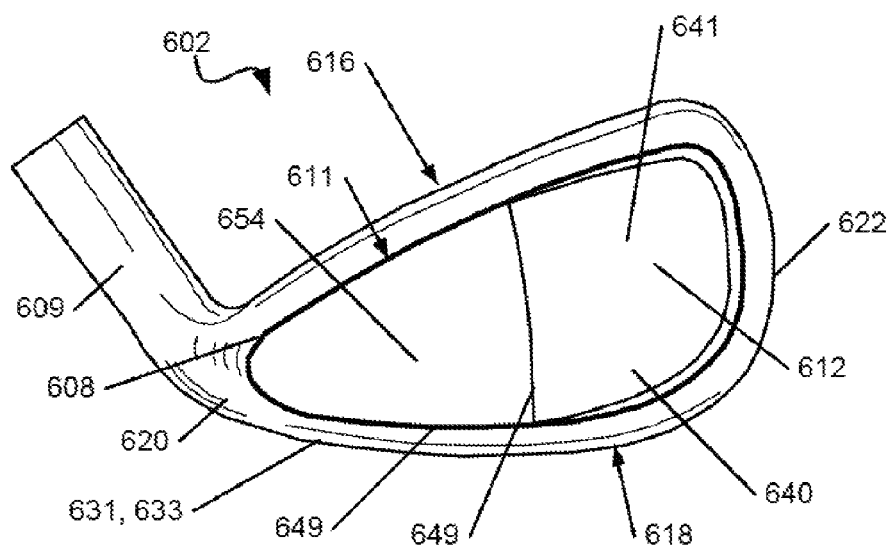
FIG. 22 is a rear view of the head of FIG. 21 after removal of material in one configuration.
Figure 23:
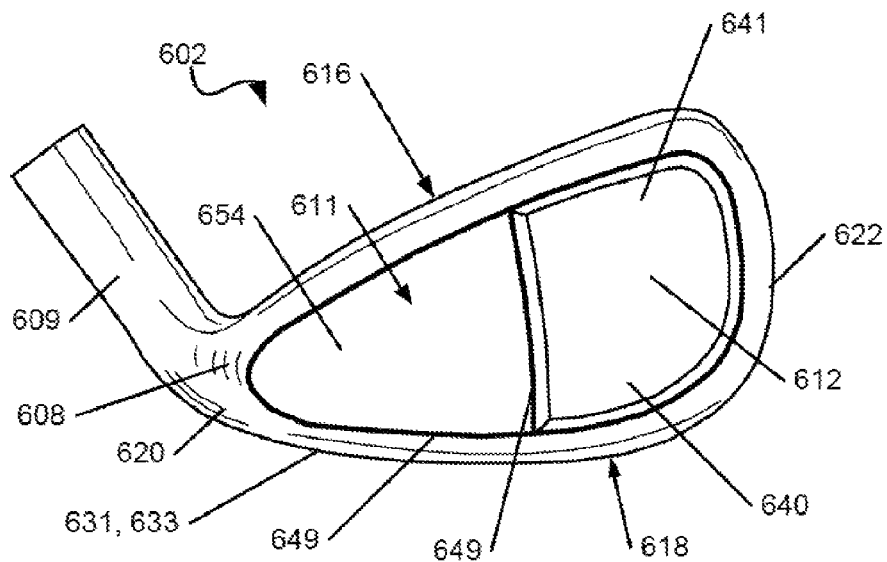
FIG. 23 is a rear view of the head of FIG. 21 after removal of material in another configuration.
Figure 24:
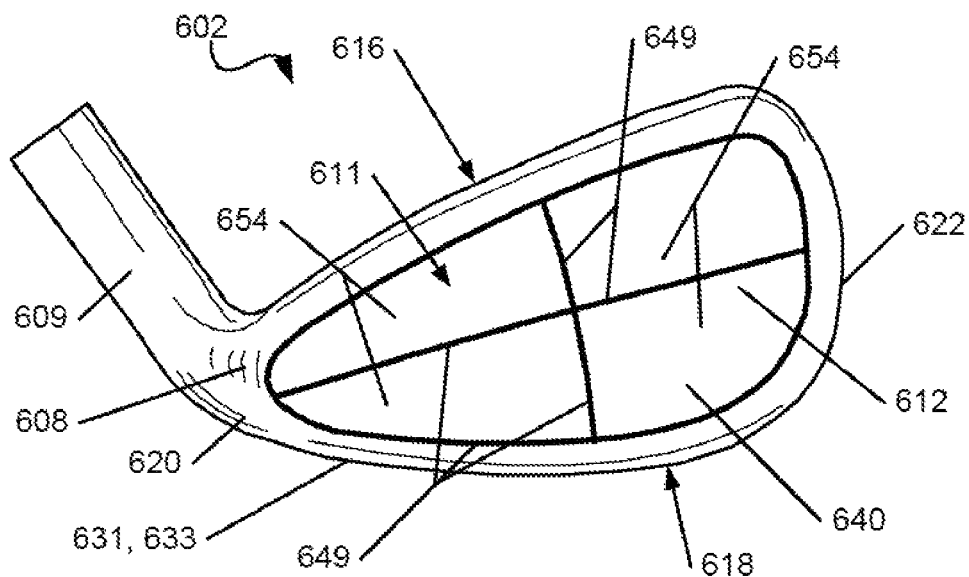
FIG. 24 is a rear view of another illustrative embodiment of a head of an iron-type ball striking device according to the present invention.
Figure 25:
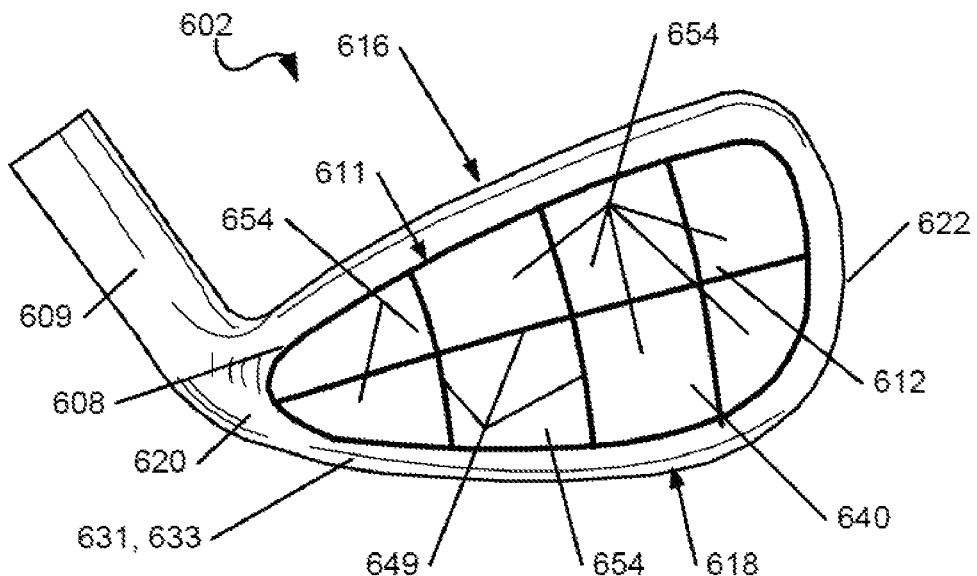
FIG. 25 is a rear view of another illustrative embodiment of a head of an iron-type ball striking device according to the present invention.

FIGS. 22 and 23 illustrate two potential configurations of the head 602 of FIG. 21 after removal of a portion of the weight element 640. In the embodiment of FIG. 22, the section 654 of the weight element 640 closest to the toe 622 has been partially removed by machining or similar technique. The material was removed from the weight element 640 in a tapered manner, so that gradually more material was removed approaching the toe 622 from the boundary indicia 649 proximate the center of the head 602. This machining configuration forms a recess or recessed portion 641 in the rear surface 611 of the face 612 that tapers such that the depth of the recess 641 increases proximate the toe 622 and decreases proximate the center of the head 602. In the embodiment of FIG. 23, the section 654 of the weight element 640 closest to the toe 622 has been completely or nearly completely removed by machining or similar technique. The material was removed from the weight element 640 at a substantially even depth, between the boundary indicia 649 proximate the center of the head 602 and the toe 622. This machining configuration forms a recess or recessed portion 641 in the rear surface 611 of the face 612, proximate the toe 622, and the recess 641 that has a relatively constant depth. It is understood that additional options for material removal can be used in connection with the head 602 of FIG. 21.

Figure 26:
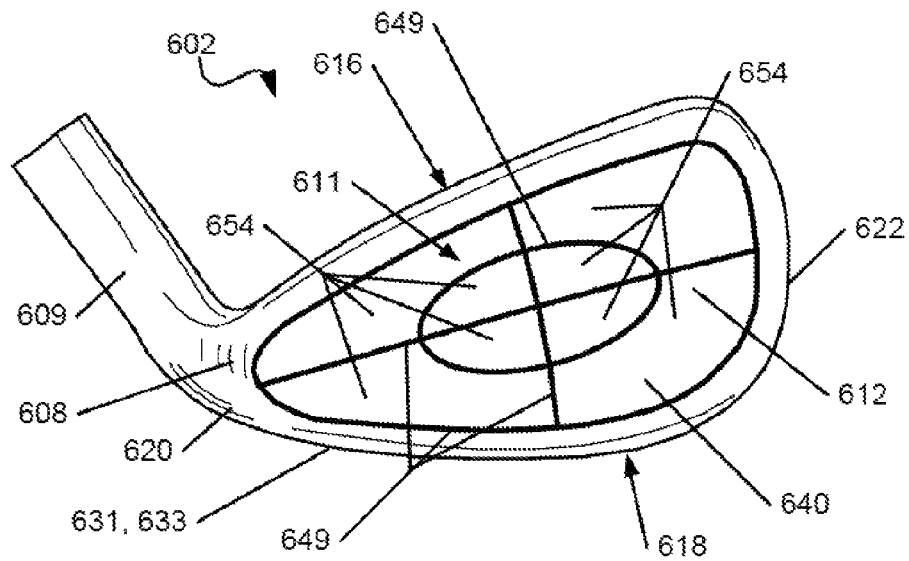
FIG. 26 is a rear view of another illustrative embodiment of a head of an iron-type ball striking device according to the present invention.
Figure 27:
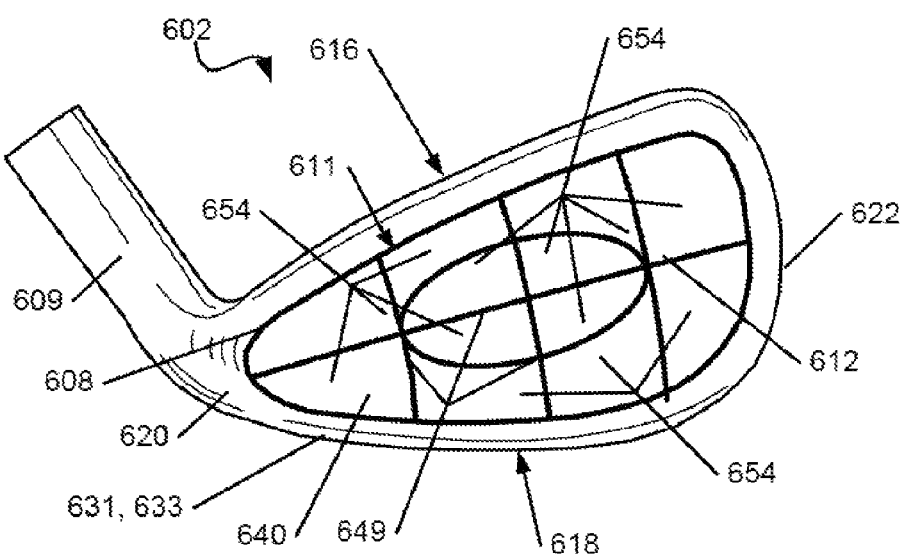
FIG. 27 is a rear view of another illustrative embodiment of a head of an iron-type ball striking device according to the present invention.
Figure 28:
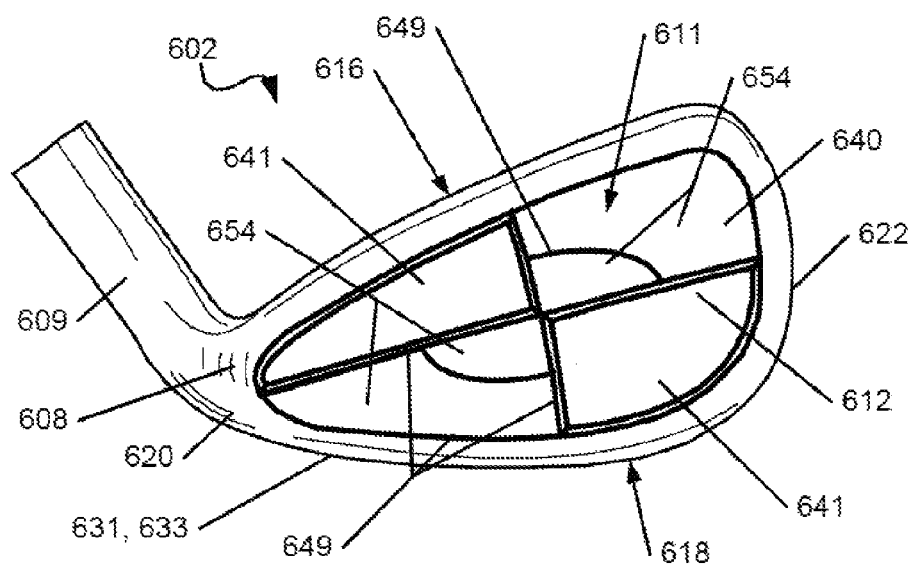
FIG. 28 is a rear view of the head of FIG. 26 after removal of material in one configuration.
Figure 29:
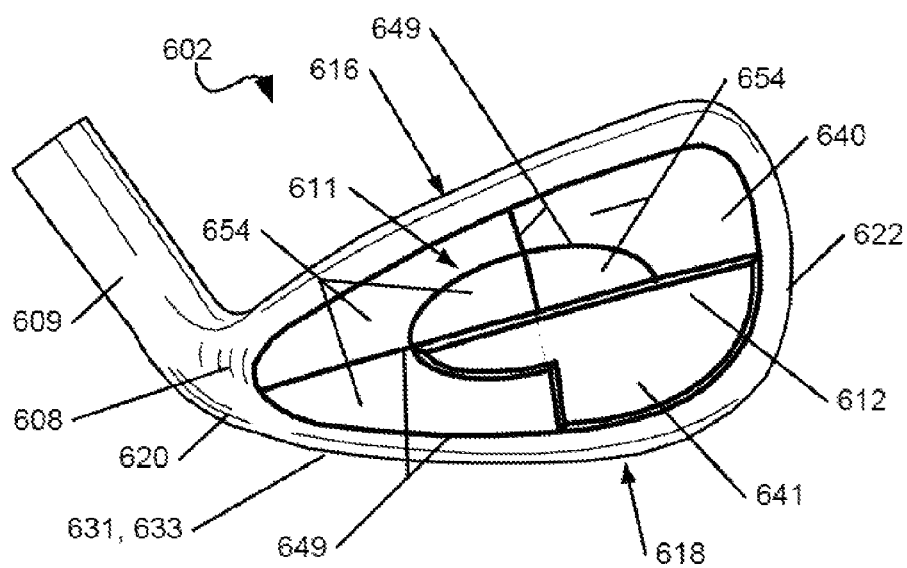
FIG. 29 is a rear view of the head of FIG. 26 after removal of material in another configuration.

FIGS. 28 and 29 illustrate two potential configurations of the head 602 of FIG. 26 after removal of a portion of the weight element 640. In the embodiment of FIG. 28, the sections 654 of the weight element 640 forming the inner and outer quadrants in the high-heel area and the sections 654 of the weight element 640 forming the inner and outer quadrants in the low-toe area have been removed completely or nearly completely by machining or similar technique. This machining configuration forms a recess or recessed portion 641 in the rear surface 611 of the face 612 proximate the high-heel and low-toe areas of the head 602. In the embodiment of FIG. 29, the sections 654 of the weight element 640 forming the two inner quadrants on the bottom half of the head 602 and the outer quadrant proximate the low-toe area have been completely or nearly completely removed by machining or similar technique. This machining configuration forms a recess or recessed portion 641 in the rear surface 611 of the face 612, proximate the low-toe region of the head 602 that extends partially to the low-heel region of the head 602 as well. It is understood that additional options for material removal can be used in connection with the head 602 of FIG. 26. For example, as described above, the head 602 may be configured for removal of a certain number of inner quadrants and/or outer quadrants, which may depend on the target weight. In the embodiment of FIG. 28, two inner quadrants and two outer quadrants have been removed, and in the embodiment of FIG. 29, two inner quadrants and one outer quadrant have been removed. The numerous sections 654 of the head 602 of FIG. 26 (and likewise of the head 602 of FIG. 27) present a number of options for machining configurations. Still further examples are contemplated within the scope of the present invention, including any other embodiments and variations described herein.

In the embodiments of FIGS. 10-29, the heads 402, et seq., are configured so that at least a portion of the weight element 440, et seq. can be removed, such as by machining, as described above. Each head 402, et seq., is formed with a weight that is higher than the target weight of the head 402, et seq., so that material of the weight elements 440, et seq., can be removed to change the weight of the head 402, et seq., to approximately equal the target weight, as also described above. Each of the weight elements 440, et seq., in the embodiments of FIGS. 10-29 may be accessible from outside the head 402, et seq., for material removal. The heads 402, et seq., in FIGS. 10-29 also each have visible indicia 449, et seq., identifying the weight element 440, et seq., in the form of paint, pigment, ink, dye, or other applied visible substance, although other types of indicia are possible. As described above, the material can be removed from the weight elements 440, et seq., to change the weighting of the head, such as to adjust the weight distribution, the center of gravity, and/or the moment of inertia of the head 402, et seq.

It is understood that any of the heads 402, et seq., of the embodiments shown in FIGS. 10-29 may contain additional weight elements and/or weight elements having different configurations, including the other configurations of weight elements described herein. For example, one of the iron-type heads 402, et seq., of FIGS. 10-29 may contain a weight element on the outer surface 435 of the sole member 431, or on a different surface of the head 402, et seq. Still further embodiments are contemplated. It is understood that the features and aspects described herein with respect to the heads 402, et seq., of FIGS. 10-29 can be used or adapted for use in other iron-type heads having different configurations.

Several different embodiments have been described above, including the embodiments shown in FIGS. 1-29. It is understood that any of the features of these various embodiments may be combined and/or interchanged.

Heads 102, et seq. incorporating the weight elements 140, et seq. disclosed herein may be used as a ball striking device or a part thereof. For example, a golf club 100, 400 as shown in FIGS. 1 and 10 may be manufactured by attaching a shaft or handle 104, 404 to a head that is provided, such as the head 102, 402 as described above. "Providing" the head, as used herein, refers broadly to making an article available or accessible for future actions to be performed on the article, and does not connote that the party providing the article has manufactured, produced, or supplied the article or that the party providing the article has ownership or control of the article. In other embodiments, different types of ball striking devices can be manufactured according to the principles described herein. Manufacturing the head 302 shown in FIG. 7 may include attachment of a backbody member 329 to a face frame member 328, as described above. Additionally, the head 102, et seq., golf club 100, et seq., or other ball striking device may be fitted or customized for a person by removing material from one or more weight elements 140 et seq., such as by a technique described above, to achieve a desired weighting of the head, including a desired weight distribution, center of gravity location, and/or moment of inertia. Such customization may include removing material by machining, milling, or other technique described above or known in the art. In some circumstances, this customization may be done by a custom fitting shop, by a manufacturer, or by the user himself or herself, among others. As also described above, two or more clubs having heads 102, 202, 302, 402, 502, 602, 702, 802 in accordance with one or more embodiments described herein may be assembled and sold as a set of golf clubs, with a plurality of club heads being configured for material removal. In such a set, material removal may be the same or similar for each club and/or may differ for some or all clubs, based on the type of club and the desired weight distribution and effects on ball impact and flight.

The ball striking devices and heads therefor as described herein provide many benefits and advantages over existing products. For example, the ability to remove material from the weight elements provides a nearly limitless number of weighting configurations for the head, providing a high degree of weighting customizability, allowing the weight distribution, center of gravity and/or moment of inertia to be controlled and adjusted as desired. In turn, this customizability can be used to create a head that achieves a specific ball trajectory, spin, flight, etc., as desired. This customizability can also be used to create a head that addresses specific characteristics of a specific user's swing, such as hitting (or mis-hitting) patterns for the user. Additionally, the ability to remove material from the weight elements provides the ability for the user to control the total weight of the head. Further benefits and advantages are recognizable by those skilled in the art.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

The invention claimed is:

1. An iron-type golf club head comprising:
   an iron-type face having a ball-striking surface configured for striking a ball;
   an iron-type golf club body connected to the face and extending rearward from the face and having a rear surface; and
   at least one weight element integrally formed with the body, wherein the head has a total weight that is higher than a target weight of the head, and wherein the at least one weight element is configured to be at least partially removed by machining the rear surface to lower the total weight of the head to approximately equal the target weight;
   wherein the at least two sections include boundaries marked by visible indicia.

2. The iron-type golf club head of claim 1, wherein the weight element comprises at least two sections, and wherein at least one of the at least two sections is configured to be at least partially removed by machining the rear surface to lower the total weight of the head to approximately equal the target weight.

3. The iron-type golf club head of claim 2, wherein the weight element comprises two sections arranged vertically.

4. The iron-type golf club head of claim 2, wherein the weight element comprises two sections arranged horizontally.

5. The iron-type golf club head of claim 1, wherein the weight element comprises at least four sections, and wherein at least one of the at least four sections is configured to be at least partially removed by machining the rear surface to lower the total weight of the head to approximately equal the target weight.

6. The iron-type golf club head of claim 1, wherein the weight element comprises at least eight sections, and wherein at least one of the at least eight sections is configured to be at least partially removed by machining the rear surface to lower the total weight of the head to approximately equal the target weight.

7. An iron-type golf club head comprising:
   an iron-type face having a ball-striking surface configured for striking a ball;
   an iron-type golf club body connected to the face and extending rearward from the face; and
   at least one weight element integrally formed with the body, wherein the head has a total weight that is higher than a target weight of the head, wherein the at least one weight element is configured to be at least partially removed to lower the total weight of the head to approximately equal the target weight, and wherein one of the weight element and the body contain visible indicia to identify the weight element;
   wherein the visible indicia is a surface finish.

8. The iron-type golf club head of claim 7, wherein the head has a total weight that is 10-30 grams higher than a target weight of the head.

9. The iron-type golf club head of claim 7, wherein the body comprises a peripheral wall extending rearward from the face, wherein the at least one weight element is integrally formed with the peripheral wall.

10. The iron-type golf club head of claim 7, wherein the body comprises a rear surface rearward from the face, and wherein the at least one weight element is integrally formed with the rear surface.

11. An iron-type golf club head comprising:
    an iron-type face having a ball-striking surface configured for striking a ball;
    an iron-type golf club body connected to the face and extending rearward from the face; and
    at least one weight element integrally formed with the body, wherein the head has a total weight that is higher than a target weight of the head, wherein the at least one weight element is configured to be at least partially removed to lower the total weight of the head to approximately equal the target weight, and wherein one of the weight element and the body contain visible indicia to identify the weight element;
    wherein the visible indicia is a texture.

12. The iron-type golf club head of claim 11, wherein the head has a total weight that is 10-30 grams higher than a target weight of the head.

13. The iron-type golf club head of claim 11, wherein the body comprises a peripheral wall extending rearward from the face, wherein the at least one weight element is integrally formed with the peripheral wall.

14. The iron-type golf club head of claim 11, wherein the body comprises a rear surface rearward from the face, and wherein the at least one weight element is integrally formed with the rear surface.

* * * * *